United States Patent

Sano et al.

Patent Number: 5,831,626
Date of Patent: Nov. 3, 1998

[54] METHOD AND APPARATUS FOR GENERATING HALFTONE IMAGE WITH HALFTONE DOT RATE CORRECTION

[75] Inventors: Hiroshi Sano; Takahide Hirawa; Yasunori Nakamura, all of Kyoto, Japan

[73] Assignee: Dainippon Screen Mfg. Co., Ltd., Kyoto, Japan

[21] Appl. No.: 601,663

[22] Filed: Feb. 14, 1996

[30] Foreign Application Priority Data

Feb. 21, 1995 [JP] Japan .................................. 7-057933

[51] Int. Cl.$^6$ ........................................... G06T 3/00
[52] U.S. Cl. ............................................. 345/431
[58] Field of Search ................... 395/128–132, 395/133, 135, 137, 139, 141; 345/428–433, 435, 437, 439, 441

[56] References Cited

U.S. PATENT DOCUMENTS 4,903,123  2/1990  Kawamura et al. .................... 358/75
5,537,223  7/1996  Curry .................................. 358/460

FOREIGN PATENT DOCUMENTS

| 0 141 869 A1 | 5/1985 | European Pat. Off. . |
| 0 334 518 A2 | 9/1989 | European Pat. Off. . |
| 0 533 593 A2 | 3/1993 | European Pat. Off. . |
| 55-6393 | 1/1980 | Japan . |

OTHER PUBLICATIONS

William F. Schreiber, "Fundamentals of Electronic Imaging Systems" 1986, Springer–Verlag, Berlin (DE) pp. 160–183, XP002020421.

*Primary Examiner*—Almis R. Jankus
*Attorney, Agent, or Firm*—McDermott, Will & Emery

[57] ABSTRACT

A plurality of correction look-up tables are prepared corresponding to offsets of halftone dot areas. An offset of a halftone dot area including the subject pixel is calculated, and a correction look-up table specified by the offset is selected in order to correct an input density value. Threshold values read out from an SPM (screen pattern memory) 130 may be corrected instead. Alternatively, a plurality of SPMs are prepared, each of which stores corrected threshold values corresponding to each offset, and an appropriate SPM is selected according to the offset. Accordingly, halftone dots are generated to faithfully reproduce a desired tone specified by multi-tone image data.

14 Claims, 19 Drawing Sheets

Fig. 1(A)
THRESHOLD MATRIX
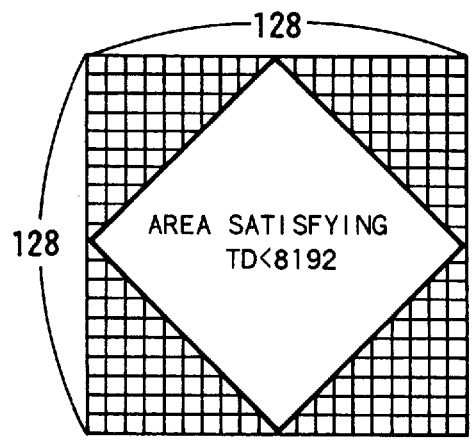
Fig. 1(B)
POSITIONS OF THRESHOLD VALUES REFERRED TO
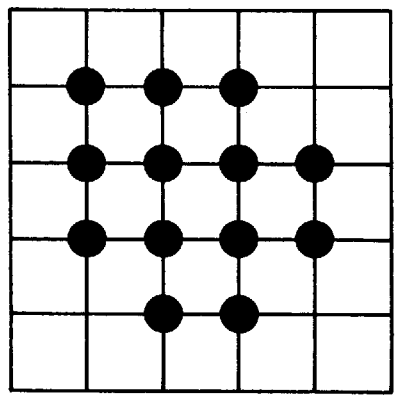
Fig. 1(C)
THRESHOLD VALUES
| 16382 | 12400 | 9300 | 9000 | 12600 | 15900 |
| 13000 | ⬬8100 | ⬬100 | ⬬400 | 8400 | 12100 |
| 9200 | ⬬200 | ⬬50 | ⬬20 | ⬬300 | 9100 |
| 8900 | ⬬320 | ⬬40 | ⬬60 | ⬬220 | 8800 |
| 12500 | 8200 | ⬬410 | ⬬110 | 8300 | 12300 |
| 16000 | 12620 | 9400 | 8700 | 12200 | 16300 |

IMAGE DATA CORRECTION CURVE

PIXELS TO BE EXPOSED
WITHOUT CORRECTION

13 PIXELS EXPOSED

PIXELS TO BE EXPOSED
WITH CORRECTION

18 PIXELS EXPOSED

EXAMPLE WITH VARIED
SCREEN ANGLE $\theta$

EXAMPLE WITH VARIED SCREEN RULING Rh (LPI)

$$\frac{1}{Rh'} = \frac{1.5}{Rh}$$

EXAMPLE WITH VARIED RESOLUTION Rd (DPI) OF OUTPUT DEVICE $$\frac{1}{Rd'} = \frac{1.5}{Rd}$$

DOT AREA COORDINATES (Xi, Yi)

SPM ADDRESS (Xd, Yd)

REVISION OF DOT AREA COORDINATES

DOT AREA SPECIFIED BY DOT
AREA COORDINATES (Xi, Yi)=(0, 1)

METHOD AND APPARATUS FOR GENERATING HALFTONE IMAGE WITH HALFTONE DOT RATE CORRECTION

BACKGROUND OF THE INVENTION

1. Field of the Invention

The present invention relates to a method of generating a halftone image based on multi-tone image data and also to an apparatus for the same.

2. Description of the Related Art

The halftoning technique expresses the density of an image by a dot percent or a area rate of a halftone dot. An arrangement of halftone dots in a halftone image is defined by a screen ruling (or a pitch of halftone dots) and a screen angle (or an angle of the dot arrangement relative to a scanning direction). The conventional halftoning technique applies a constant screen ruling over the entire image, and thus the roughness/fineness of the image is controlled by the screen ruling.

In color printing technique, an original color image is separated into four primary colors to generate four color separation halftone images. The relationship among the halftone dot arrangements of the four color separations, that is, the relationship between the four sets of the screen angle and the screen ruling, is extremely important in high-quality printing. Especially it is required that the screen angles of the four color separations are exactly set to predetermined values.

There are two typical methods applied to generate halftone dots: Rational Tangent Method in which a tangent of screen angle θ (tanθ) is a rational number, and Irrational Tangent Method in which an tangent of screen angle θ is an irrational number. The Rational Tangent Method does not allow the user to set an arbitrary screen ruling, but generates halftone images having a predetermined screen ruling specified by a preset threshold matrix. The Irrational Tangent Method, on the other hand, can adjust the screen ruling by selectively reading out some threshold values from a threshold matrix while skipping others according to the screen ruling. Thus, the Irrational Tangent Method can set an arbitrary screen ruling and an accurate screen angle by varying the way of reading out threshold values from a threshold matrix.

FIGS. 1(A) through 1(C) show a process of generating halftone dots by the Irrational Tangent Method. FIG. 1(A) shows a 128×128 matrix including threshold values in a range of 0 to 16383. A rhombic area on the center of FIG. 1(A) is defined by the threshold values TD less than a value (=8192) corresponding to an image density of 50%. When the entire halftone dot area consists of 128×128 pixels, all the threshold values in the matrix of FIG. 1(A) are to be used in generating one halftone dot. The typical process of generating a halftone image successively reads out threshold values from the threshold matrix, compares the read-out threshold values with multi-tone image data to determine on/off state of pixels, and generates a halftone dot based on the result of the comparison. For the image density of 50%, for example, halftone dots having the rhombic area shown in FIG. 1(A) are recorded.

The conventional Irrational Tangent Method, however, does not always reflect the exact density expressed by multi-tone image data on the dot percent or the halftone dot area rate. When the entire halftone dot area consists of 6×6 pixels according to a specified screen ruling, for example, 6×6 threshold values are read out from the threshold matrix of FIG. 1(A) to be compared with multi-tone image data while other threshold values are skipped. FIG. 1(B) shows positions of threshold values read out from the matrix under such conditions, and FIG. 1(C) shows the read-out threshold values. When the value of multi-tone image data is 8192, the pixels which have threshold values less than 8192 are exposed to generate a halftone dot. The threshold values circled in FIG. 1(C) have values less than 8192, and the pixels having these threshold values are recorded as shown by the solid circles in FIG. 1(B) to generate a halftone dot. The example of FIG. 1(B) includes 13 pixels of solid circles, which means the dot percent of 13/36=0.36 (36%). Since the value of the multi-tone image data (=8192) corresponds to the density of 50%, the dot given in FIG. 1(B) does not faithfully reproduce the tone level expressed by the multi-tone image data. Like this example, the Irrational Tangent Method may not accurately reproduce the dot percent corresponding to the tone level expressed by the multi-tone image data. Similar problem is also observed in the Rational Tangent Method.

SUMMARY OF THE INVENTION

An object of the present invention is thus to generate halftone dots which faithfully reproduce a tone level specified by multi-tone image data.

The present invention is directed to a method of comparing multi-tone image data with a threshold value to generate a halftone image signal representing an on/off state of each of pixels arranged in lattices on an image plane, and forming a halftone dot in response to the halftone image signal in each halftone dot area which is repeatedly arranged to form an array of halftone dot areas on the image plane. The method comprises the step of: (a) correcting at least either of the multi-tone image data and the threshold value so that a halftone dot is formed in the each halftone dot area to have a desired halftone dot percent specified by the multi-tone image data.

The above method compares corrected multi-tone image data with a threshold value or alternatively multi-tone image data with a corrected threshold value, thereby forming a halftone dot having a desired dot percent corresponding to the multi-tone image data in each halftone dot area. This results in generating halftone dots which faithfully reproduce a desired tone level specified by the multi-tone image data.

Preferably, the step (a) includes the steps of: (b) determining an offset for the each halftone dot area including a subject pixel to be processed, as a function of a resolution of the pixels as well as a screen ruling and a screen angle which define the array of halftone dot areas on the image plane, the offset representing a deviation of a predetermined reference point of the each halftone dot area from the pixel lattices; and (c) correcting at least either of the multi-tone image data and the threshold value according to the offset.

Since the appropriate degree of correction depends on the offset of the halftone dot area, the above steps attain appropriate correction according to the offset.

In a preferred embodiment of the present invention, the method further comprises the step of: preparing a plurality of correction look-up tables with respect to a plurality of combinations of the screen ruling, the screen angle, the resolution of the pixels, and the offset, the plurality of correction look-up tables being adaptable to be used to perform the correcting at the step (c). Further, the step (c) includes the steps of: selecting one of the plurality of correction look-up tables according to the offset; and correcting one of the multi-tone image data and the threshold value based on the selected correction look-up tables.

In another embodiment, the step (a) further comprises the step of: preparing a plurality of corrected threshold matrices with respect to a plurality of combinations of the screen ruling, the screen angle, the resolution of the pixels, and the offset; and wherein the step (c) includes the steps of: selecting one of the plurality of corrected threshold matrices according to the offset; and reading out a corrected threshold value from the corrected threshold matrix thus selected.

The desired halftone dot percent corresponding to multi-tone image data Io is given by M(Io)/Mt, where M(Io) denotes the number of pixels to form the halftone dot in the each halftone dot area, and Mt denotes a total number of pixels in one halftone dot area. The step (a) includes the step of: correcting the multi-tone image data to be greater than an M(Io)-th lowest value among Mt threshold values corresponding to Mt pixels existing in the each halftone dot area.

Alternatively, the desired halftone dot percent corresponding to multi-tone image data Io is given by M(Io)/Mt, where M(Io) denotes the number of pixels to form the halftone dot in the each halftone dot area, and Mt denotes a total number of pixels in one halftone dot area; and wherein the step (a) includes the step of: correcting the lowest through an M(Io)-th lowest values among Mt threshold values corresponding to Mt pixels existing in the each halftone dot area to be less than the multi-tone image data Io.

The present invention is also directed to an apparatus for comparing multi-tone image data with a threshold value to generate a halftone image signal representing an on/off state of each of pixels arranged in lattices on an image plane, and forming a halftone dot in response to the halftone image signal in each halftone dot area which is repeatedly arranged to form an array of halftone dot areas on the image plane. The apparatus comprises: a threshold memory for storing the threshold value representing a shape of a halftone dot according to an image density; and correction means for correcting at least either of the multi-tone image data and the threshold value so that a halftone dot is formed in the each halftone dot area to have a desired halftone dot percent specified by the multi-tone image data.

In a preferred embodiment of the present invention, the correction means includes: offset calculating means for determining an offset for the each halftone dot area including a subject pixel to be processed, as a function of a resolution of the pixels as well as a screen ruling and a screen angle which define the array of halftone dot areas on the image plane, the offset representing a deviation of a predetermined reference point of the each halftone dot area from the pixel lattices; and correction executing means for correcting at least either of the multi-tone image data and the threshold value according to the offset.

Preferably, the correction executing means includes: look-up table preparation means for preparing a plurality of correction look-up tables with respect to a plurality of combinations of the screen ruling, the screen angle, the resolution of the pixels, and the offset, the plurality of correction look-up tables being adaptable to be used to correct the multi-tone image data; selection means for selecting one of the plurality of correction look-up tables according to the offset calculated by the offset calculating means; and means for correcting the multi-tone image data based on the correction look-up table selected by the selection means.

The desired halftone dot percent corresponding to multi-tone image data Io is given by M(Io)/Mt, where M(Io) denotes the number of pixels to form the halftone dot in the each halftone dot area, and Mt denotes a total number of pixels in one halftone dot area. The look-up table preparation means includes: means for obtaining corrected multi-tone image data Ic for each of the multi-tone image data Io, the corrected multi-tone image data Ic being set to be greater than an M(Io)-th lowest value among Mt threshold value corresponding to Mt pixels existing in the each halftone dot area; and means for registering relations between the multi-tone image data Io and the corrected multi-tone image data Ic into the plurality of correction look-up tables.

In another embodiment, the correction executing means includes: look-up table preparation means for preparing a plurality of correction look-up tables with respect to a plurality of combinations of the screen ruling, the screen angle, the resolution of the pixels, and the offset, the plurality of correction look-up tables being adaptable to be used to correct the threshold value; selection means for selecting one of the plurality of correction look-up tables according to the offset calculated by the offset calculating means; and means for correcting the threshold value based on the correction look-up table selected by the selection means.

The desired halftone dot percent corresponding to multi-tone image data Io is given by M(Io)/Mt, where M(Io) denotes the number of pixels to form the halftone dot in the each halftone dot area, and Mt denotes a total number of pixels in one halftone dot area. The look-up table preparation means includes: means for determining corrected threshold values by setting the lowest through an M(Io)-th lowest values among Mt threshold values corresponding to Mt pixels existing in the each halftone dot area to be less than the multi-tone image data Io; and means for registering relations between the multi-tone image data Io and the corrected threshold value into the plurality of correction look-up tables.

In another aspect of the present invention, the apparatus comprises: offset calculating means for determining an offset for the each halftone dot area including a subject pixel to be processed, as a function of a resolution of the pixels as well as a screen ruling and a screen angle which define the array of halftone dot areas on the image plane, the offset representing a deviation of a predetermined reference point of the each halftone dot area from the pixel lattices; matrix preparation means for preparing a plurality of corrected threshold matrices for a plurality of combinations of the screen ruling, the screen angle, the resolution of the pixels, and the offset, the plurality of corrected threshold matrices being adaptable to be compared with the multi-tone image data so that a halftone dot is formed in the each halftone dot area to have a desired halftone dot percent specified by the multi-tone image data; a plurality of threshold memories for storing the plurality of corrected threshold matrices; selection means for selecting one of the plurality of threshold memories according to the offset calculated by the offset calculating means; means for reading out a corrected threshold value from the threshold memory selected by the selection means; and comparison means for comparing the corrected threshold value read out from the selected threshold memory with the multi-tone image data, thereby generating the halftone image signal.

The desired halftone dot percent corresponding to multi-tone image data Io is given by M(Io)/Mt, where M(Io) denotes the number of pixels to form the halftone dot in the each halftone dot area, and Mt denotes a total number of pixels in one halftone dot area. The matrix preparation means comprises: means for correcting the lowest through an M(Io)-th lowest values among Mt threshold values corresponding to Mt pixels existing in the each halftone dot area to be less than the multi-tone image data Io, to thereby obtain corrected threshold values to be stored in the plurality of corrected threshold matrices.

These and other objects, features, aspects, and advantages of the present invention will become more apparent from the following detailed description of the preferred embodiments with the accompanying drawings.

BRIEF DESCRIPTION OF THE DRAWINGS

FIGS. 1(A) through 1(C) show a process of generating dots by the Irrational Tangent Method;

DESCRIPTION OF THE PREFERRED EMBODIMENT

A. Fundamental Idea of Correcting Image Data

Figure 2:
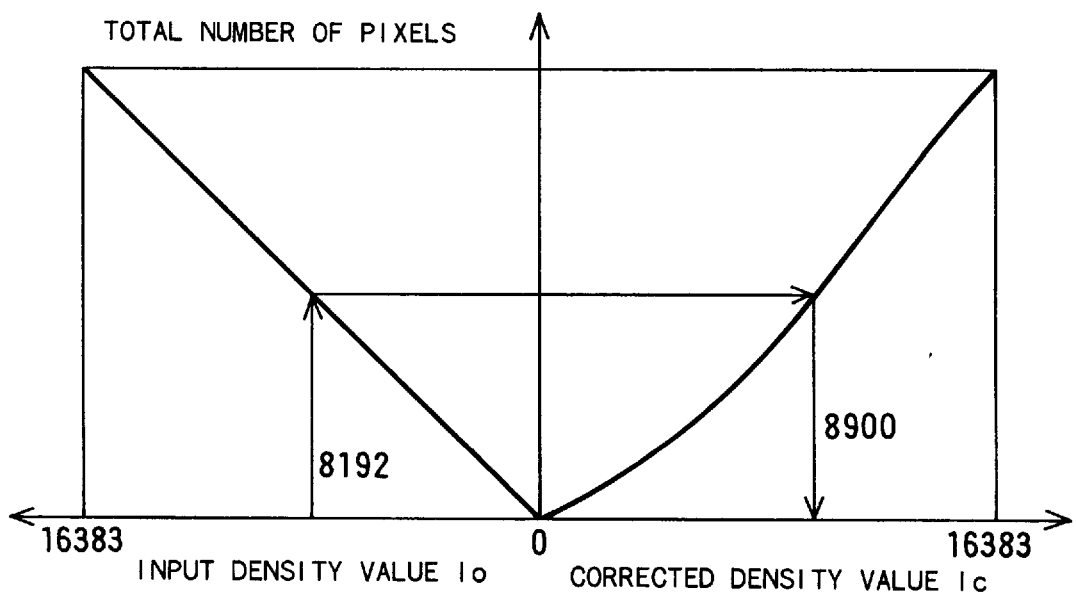
FIGS. 2(A) through 2(C) show a fundamental idea of correcting image data in the present invention.
Figure 2:
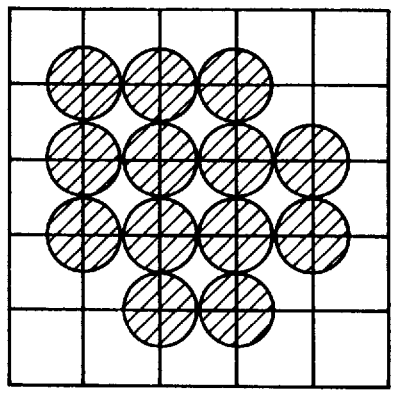
Figure 2:
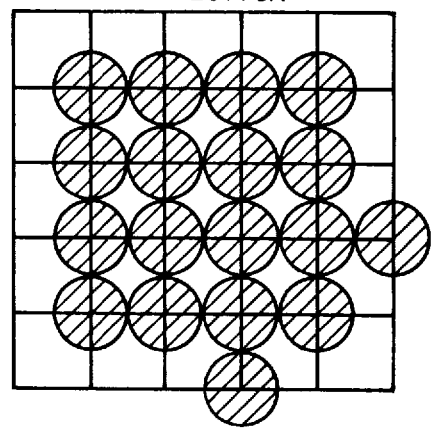

FIGS. 2(A) through 2(C) show a fundamental idea of correcting image data in the present invention. The left part of FIG. 2(A) is a graph with input image data (input density value) Io as abscissa and the number of pixels to be exposed as ordinate. In the description hereof, the term 'pixel' represents a smallest recording unit on an output device used for recording halftone images. Since the output device applied herein typically utilizes a light beam for recording halftone images, each pixel on the output device may hereinafter be referred to as a 'beam spot'. The term 'number of pixels to be exposed in a halftone dot area' is synonymous with 'dot percent'. Multi-tone image data represents the density of an image and the value of multi-tone image data thereby implies 'density value'.

In order to reproduce the density of an image faithfully, the number of pixels to be exposed should be proportional to the input density value Io representing the image density. FIG. 2(B) shows the pixels to be exposed when an input density value Io (=8192) is used without any correction; this is identical with the drawing of FIG. 1(B). One method of the present invention corrects the input density value Io as shown in FIG. 2(A) to adjust the number of pixels to be exposed. For the input density value Io of 8192 which corresponds to the image density of 50%, for example, the multi-tone image data is corrected to realize 50 dot percent in each halftone dot area. When the multi-tone image data is corrected to become a corrected density value Ic of 8900, for example, the number of pixels with threshold values less than 8900 (see FIG. 1(C)) will be equal to 18 as shown in FIG. 2(C). The number of pixels to be exposed by the corrected density value Ic is thus equal to 18, which exactly reproduce the image density of 50%.

Figure 3:
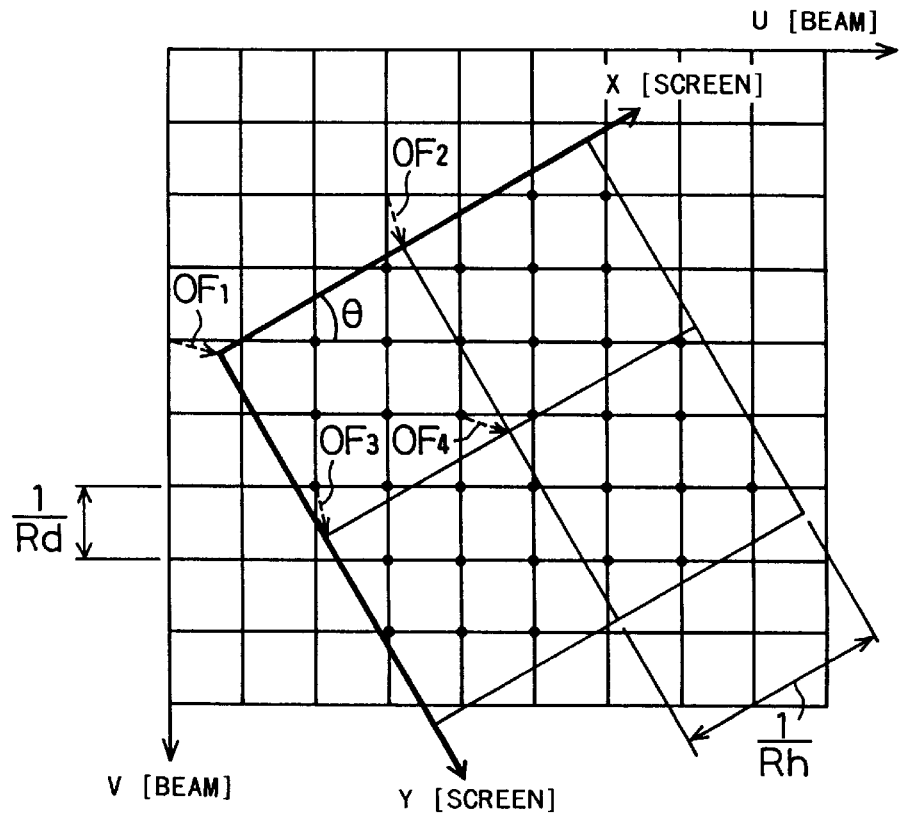
FIG. 3 shows an exemplified relationship between halftone dot areas and pixel positions in an image plane.

The positions of threshold values referred to in a threshold matrix are varied with a screen angle θ and a screen ruling Rh (line per inch (LPI)) of a halftone image of concern and a resolution Rd (dot per inch (DPI)) of an output device applied, such as a record scanner. FIG. 3 shows an example of halftone dot areas applicable to an image plane. In the drawing of FIG. 3, intersections of smaller square lattices represent positions of beam spots in the output device, and larger square lattices inclined by the angle of θ specify boundaries of halftone dot areas. One threshold matrix is applied to each halftone dot area specified by a larger square lattice, and threshold values corresponding to the positions of intersections of the smaller square lattices are read out from the threshold matrix and compared with multi-tone image data. In the description hereafter, the square lattices for defining positions of beam spots are referred to as 'beam lattices' and those for specifying boundaries of halftone dot areas as 'screen lattices'. The pitch of beam lattices is equal to the reciprocal of the resolution Rh of the output device, whereas the pitch of screen lattices is equal to the reciprocal of the screen ruling Rh. In the description, a U-V coordinate system is used to express the coordinates of beam lattices (hereinafter referred to as 'beam coordinate system'), and an X-Y coordinate system to express the coordinates of threshold values in the threshold matrix (hereinafter referred to as 'screen coordinate system').

The four halftone dot areas illustrated in FIG. 3 include beam spots at different positions. The upper-left vertex of each halftone dot area denotes a 'reference point', and a deviation of the reference point in each halftone dot area from the closest upper-left point of the corresponding beam lattice (shown by broken-line arrows in the drawing) represents an 'offset of the halftone dot area' or 'dot offset'. The four halftone dot areas shown in FIG. 3 respectively have different dot offsets OF1 through OF4. Any two halftone dot areas having identical dot offsets include beam spots at identical positions. Any two halftone dot areas having different dot offsets, on the contrary, include beam spots at different positions. The characteristics of the correction curve as shown in FIG. 2(A) thus depends on the offset of the halftone dot area.

Figure 4:
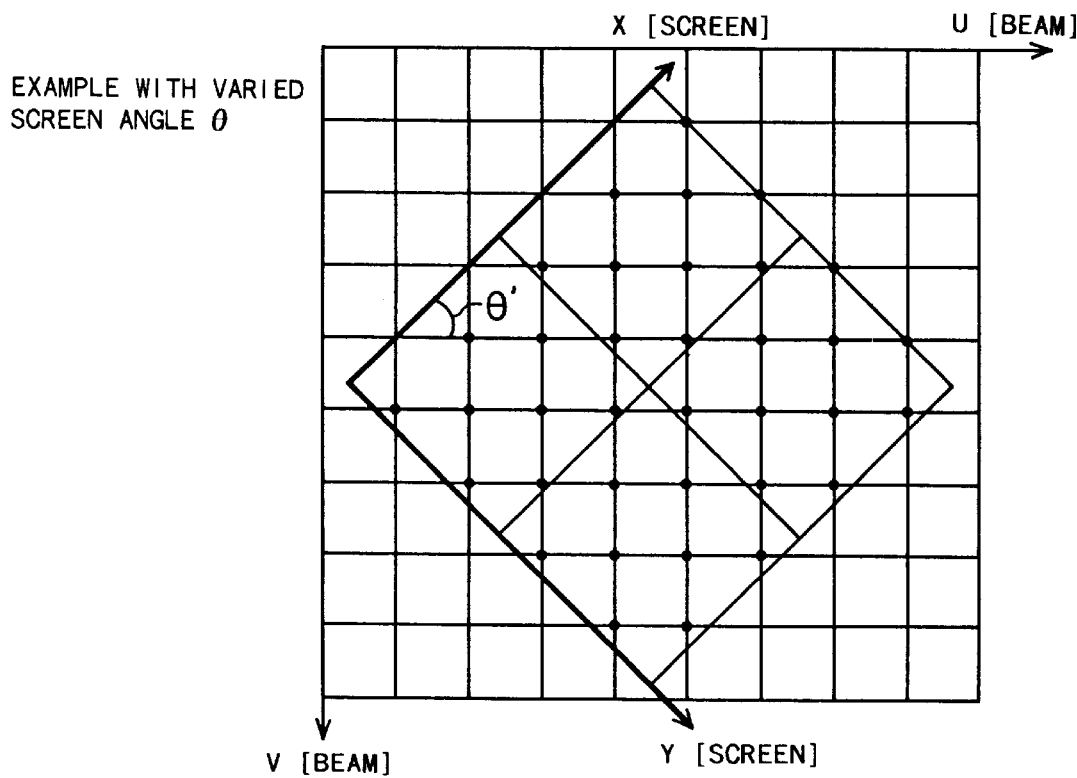
FIG. 4 shows the relationship between halftone dot areas and pixel positions with the varied screen angle θ.

FIG. 4 shows another example where the screen angle θ is different from that of FIG. 3. As can be clearly seen from the comparison between FIGS. 3 and 4, a change in screen angle θ varies the positions of beam spots included in each halftone dot area, that is, the positions of threshold values referred to.

Figure 5:
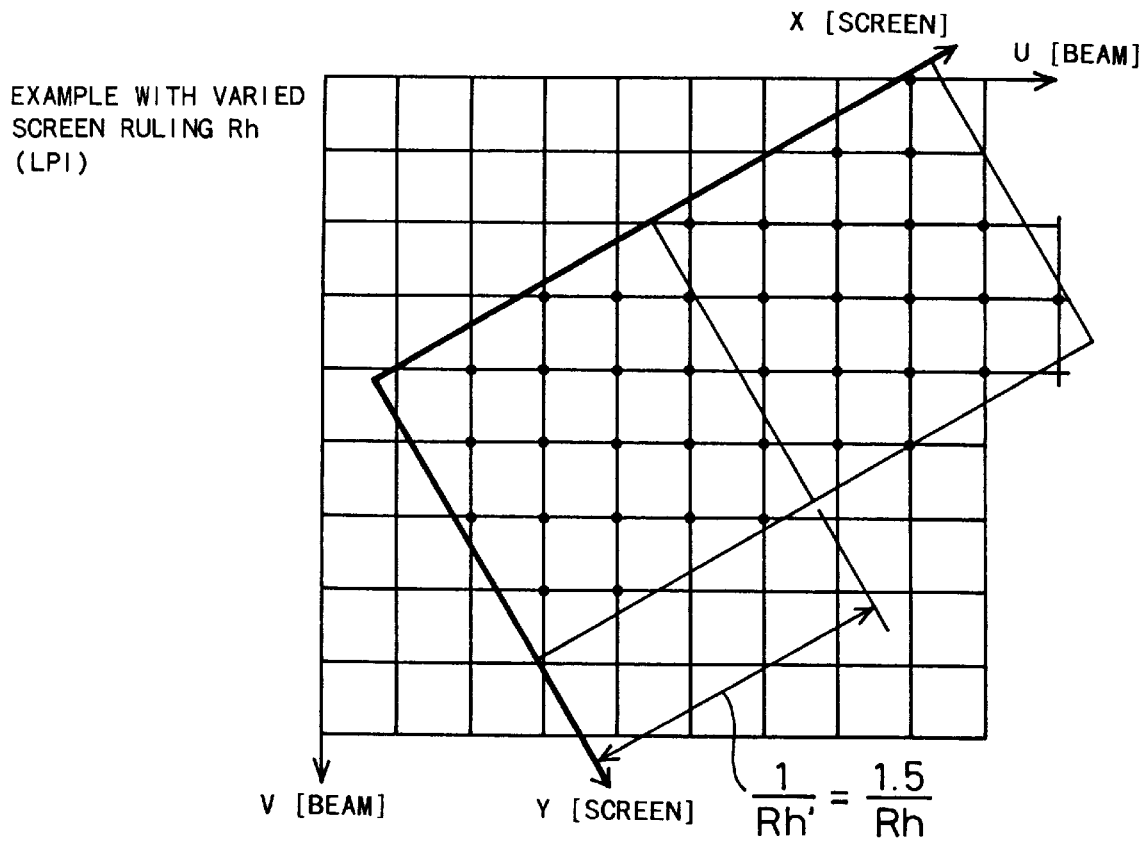
FIG. 5 shows the relationship between halftone dot areas and pixel positions with the varied screen ruling (LPI)

FIG. 5 shows still another example where the screen ruling Rh is different from that of FIG. 3. The smaller screen ruling Rh as in the example of FIG. 5 enlarges each halftone dot area and accordingly increases the number of beam spots included in each halftone dot area.

Figure 6:
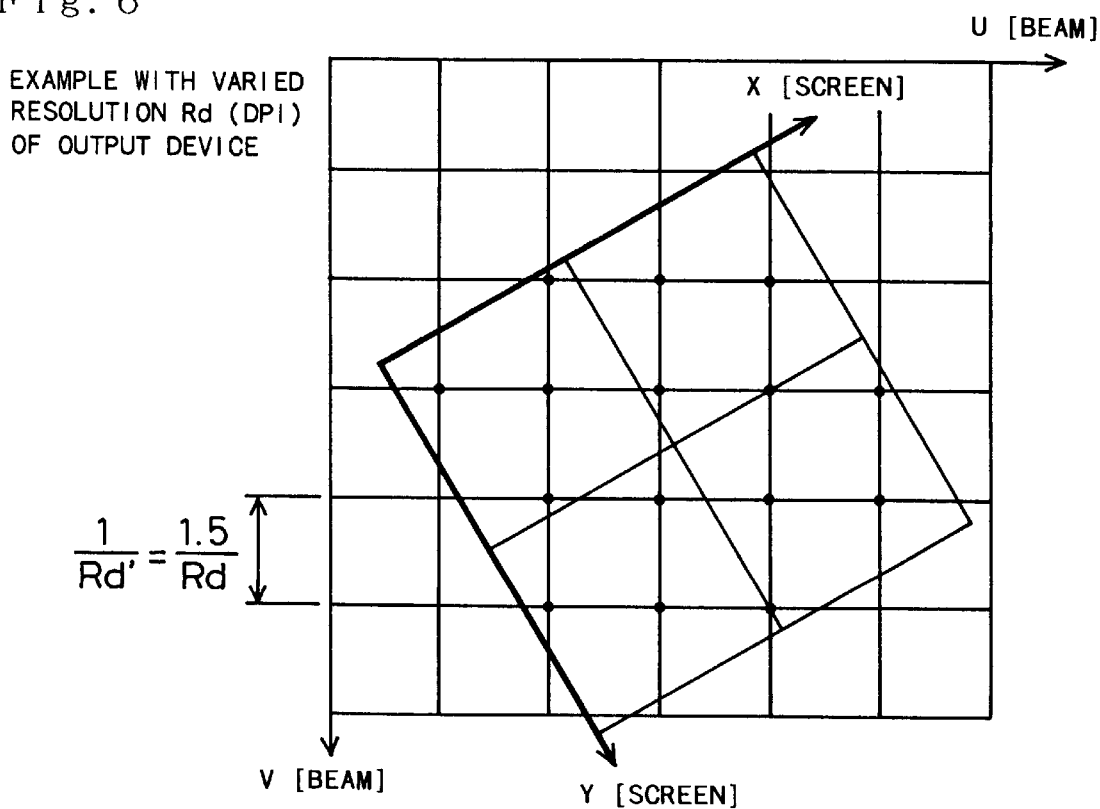
FIG. 6 shows the relationship between halftone dot areas and pixel positions with the varied resolution (DPI) of the output device.

FIG. 6 shows another example where the resolution Rd of the output device is different from that of FIG. 3. The smaller resolution Rd of the output device as in the example of FIG. 6 results in a rougher pitch of beam spots, thereby decreasing the number of beam spots included in each halftone dot area.

The positions of threshold values referred to in each halftone dot area are thus varied with the offset of the halftone dot area, the screen angle θ, the screen ruling Rh, and the resolution Rd of the output device. These characteristic values determine the characteristics of the correction curve as shown in FIG. 2(A).

B. Method of Determining Correction Curves

Figure 7:
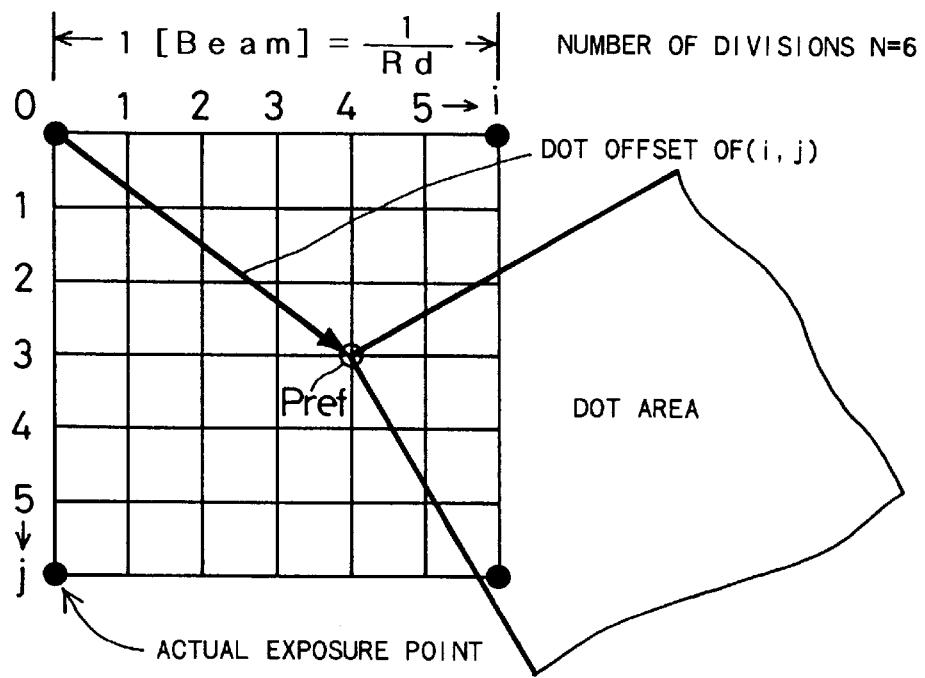
FIG. 7 shows coordinates assignable to a reference point in one halftone dot area.

Before describing the method of determining a correction curve, a possible value range for the offset of the halftone dot area is explained first. As described previously along with FIG. 3, the offset of each halftone dot area determines the positions of threshold values referred to in the halftone dot area. Restricting the possible value range for the offset of the halftone dot area to a number of predetermined values will result in restriction of the number of required correction curves. FIG. 7 shows local coordinates assignable to a reference point Pref in a certain halftone dot area (the reference point is the upper-left point of the certain halftone dot area in this embodiment). Lattice points expressed by solid circles in the drawing of FIG. 7 represent the positions of beam spots (points of exposure) on the output device, wherein the pitch of beam spots is equal to 1/Rd. In this embodiment, the pitch of beam spots (hereinafter may be referred to as pixel pitch) is divided into N equal parts, and intersections of N×N lattices are set as permissible positions for the reference point Pref within the small area defined by the four beam spots. In the example of FIG. 7, N is equal to 6, and therefore 36 positions expressed by coordinates (i,j), where i=0 to 5 and j=0 to 5, are set as the candidates of the reference point Pref. The dot offset OF is given as a vector from the position of the closest beam spot existing on the upper-left of the subject halftone dot area to the reference point Pref of the subject halftone dot area. The N×N positions assignable to the reference point Pref accordingly give different values to the dot offset OF.

In the description, the coordinates (i,j) representing the candidates of the reference point Pref are referred to as division coordinates (i,j). The dot offset OF expressed by the unit of distance (inch) is equal to (i/Rd,j/Rd). Incidentally, values other than the division coordinates (i,j) or the distance (i/Rd,j/Rd) of the dot offset OF may also be used as the dot offset index indicating one of the N×N dot offset values.

Figure 8:
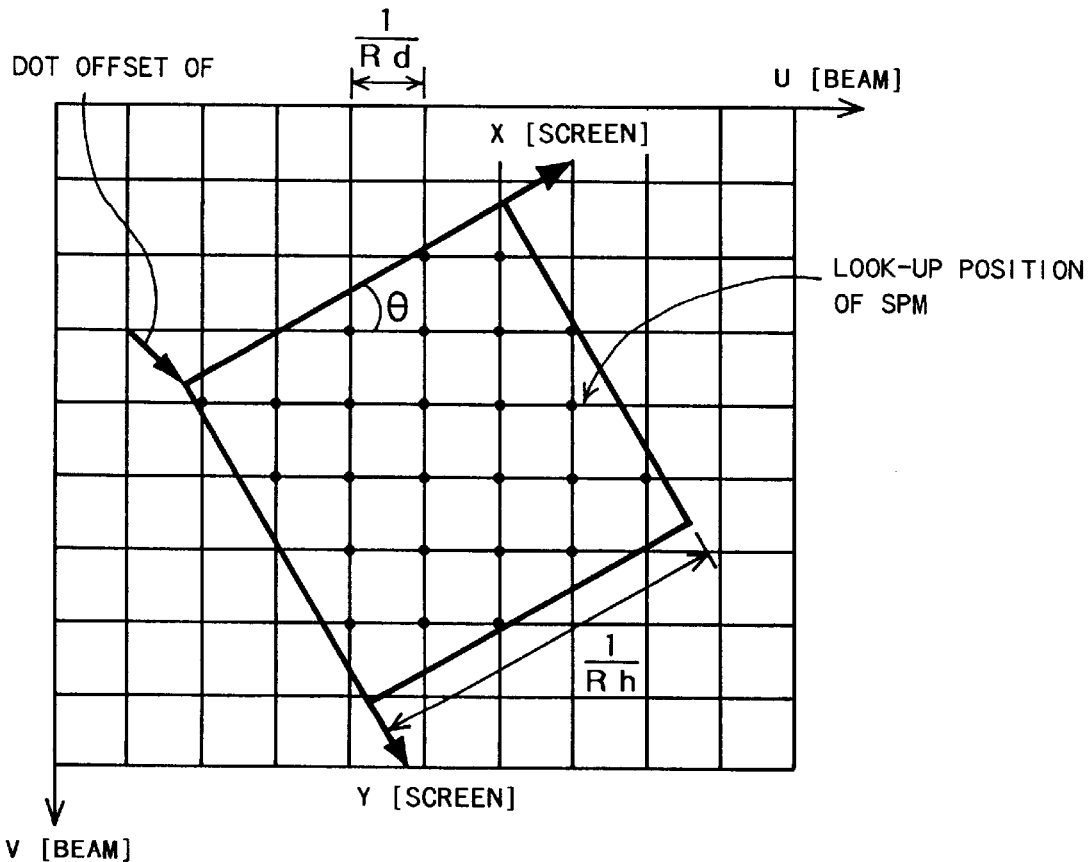
FIG. 8 shows the positions of threshold values referred to at the division coordinates (i,j)

FIG. 8 shows the positions of threshold values referred to. The positions of threshold values referred to in each halftone dot area (that is, the positions of beam spots) are determined by the division coordinates (i,j) of the dot offset OF, the screen ruling Rh, the screen angle θ, and the output resolution Rd. Since there are N×N sets of possible division coordinates (i,j) for the dot offset OF, N×N correction curves are required for each combination of the screen ruling Rh, the screen angle θ, and the output resolution Rd.

In this embodiment, look-up tables are used for realizing the correction curves as shown in FIG. 2(A). In the description hereafter, the look-up table may be referred to as 'correction look-up table' or 'screen gradation table'. A memory for storing a threshold matrix corresponding to one halftone dot area is referred to as 'screen pattern memory' or 'SPM'.

Figure 9:
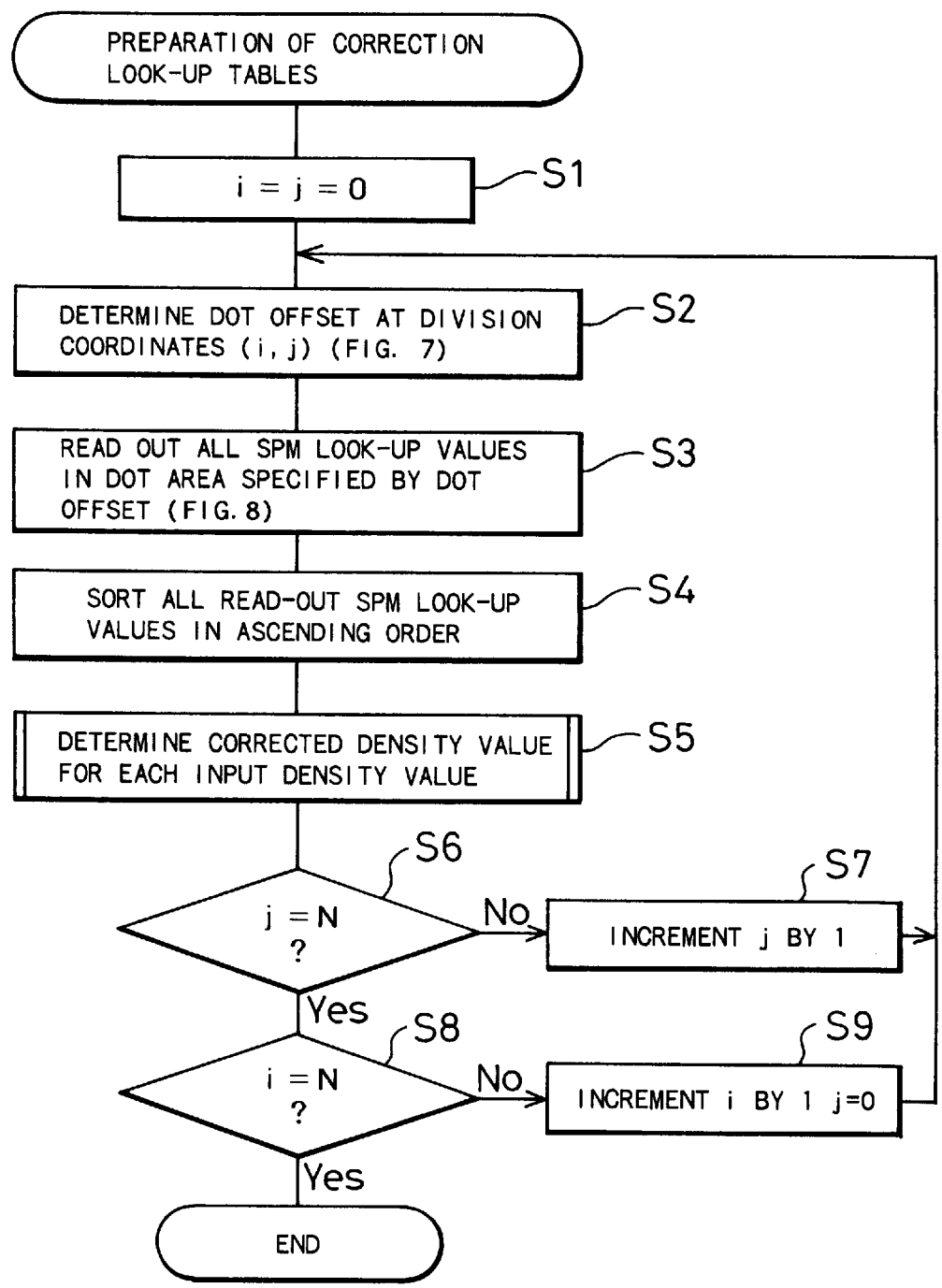
FIG. 9 is a flowchart showing a routine of preparing screen gradation tables.

FIG. 9 is a flowchart showing a routine of preparing screen gradation tables. At step S1, the values of the division coordinates (i,j) are initialized to (0,0). The program then goes to step S2 to determine the distance (i/Rd,j/Rd) of the dot offset OF at the division coordinates (i,j). All look-up values included in the halftone dot area specified by the distance of the dot offset OF (that is, threshold values at the positions expressed by the black circles in FIG. 8) are read out from a screen pattern memory at step S3. Addresses of the look-up values are determined from the distance (i/Rd, j/Rd) of the dot offset OF, the screen ruling Rh, and the screen angle θ.

The program then proceeds to step S4, at which all the look-up values read at step S3 are sorted in the ascending order. When the look-up values include 36 threshold values shown in FIG. 1(C), for example, the 36 threshold values are rearranged in the order of 20, 40, 50, 60, . . . , and 16382.

Figure 10:
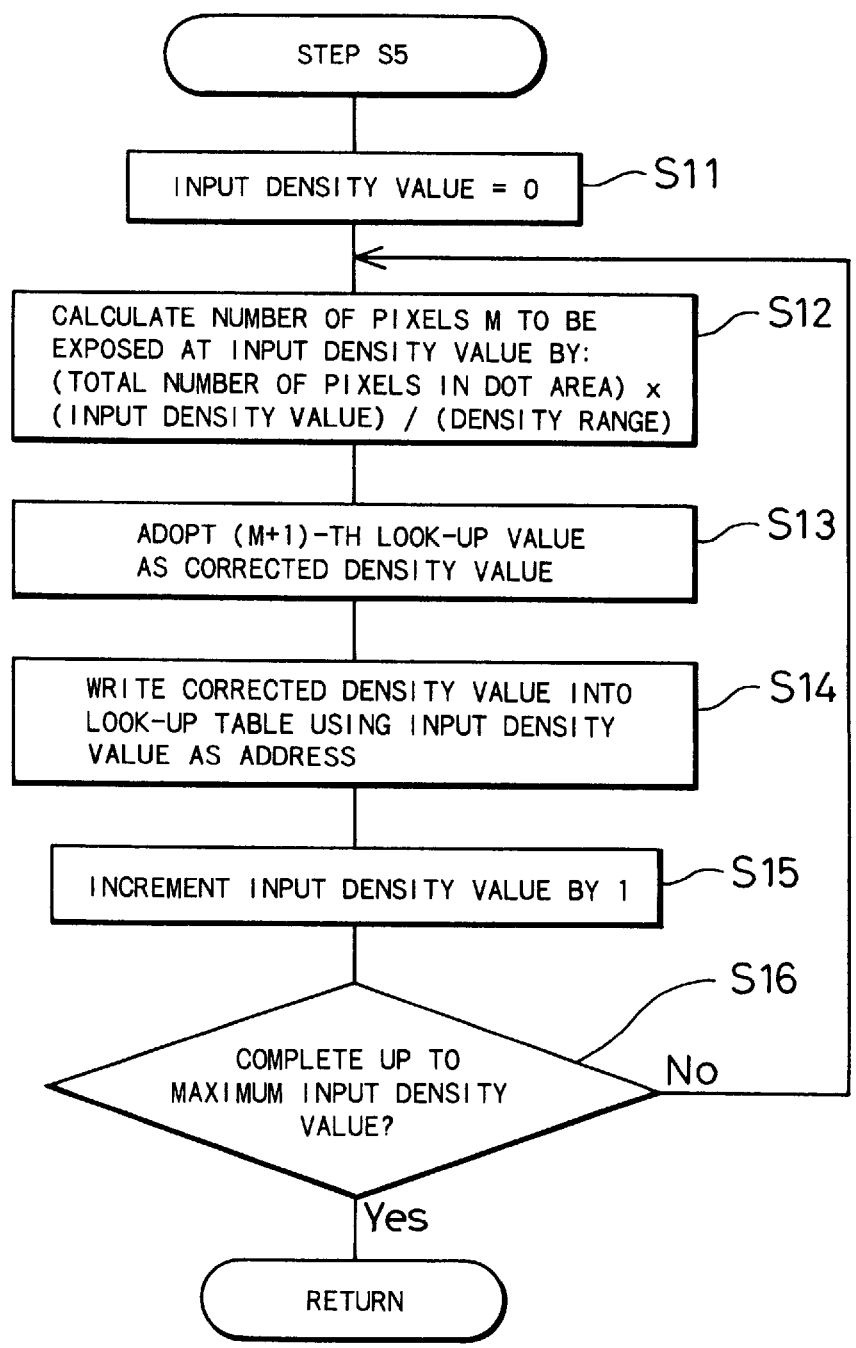
FIG. 10 is a flowchart showing details of the processing executed at step S5 in the flowchart of FIG. 9.

At step S5, a corrected density value is determined for each input density value. FIG. 10 is a flowchart showing details of the processing executed at step S5 in the flowchart of FIG. 9. At step S11, the input density value is initialized to zero. The program then goes to step S12, at which a required number of pixels M to be exposed for the faithful reproduction of the input density value is calculated according to the following equation (1):

$$M = Mt \times Io/Imax \quad (1)$$

where Mt denotes a total number of pixels in the halftone dot area, Io an input density value, and Imax a density range. The density range Imax is synonymous with the maximum value of the input density value Io. When the input density value Io is expressed as 8-bit data, for example, Imax=255. The total number of pixels Mt is equal to the total number of look-up values read at step S3 in the flowchart of FIG. 9. The above equation (1) determines the required number of pixels M to be exposed by multiplying the total number of pixels in the halftone dot area by the density percent.

At step S13, among all the look-up values sorted at step S4 in the flowchart of FIG. 9, an (M+1)-th look-up value is adopted as a corrected density value Ic. This is ascribed to the following reasons. In this embodiment, on/off of each beam spot is determined according to the inequalities (2a) and (2b) given below:

$$TD < Ic : \text{ON} \quad (2a)$$

$$Ic \leq TD : \text{OFF} \quad (2b)$$

where TD denotes a threshold value, and Ic denotes a corrected density value.

Thus, selecting the (M+1)-th look-up value as the corrected density value Ic will cause M pieces of beam spots to be exposed in this halftone dot area. This gives a dot percent of (M/Mt), which faithfully expresses the tone level of the input density value Io.

The program then goes to step S14, at which the corrected density value Ic is written into the correction look-up table while using the input density value Io as an address. This completes the process for one input density value Io.

After incrementing the input density value Io by one at step S15, the program returns to step S12 to repeat the process of steps S12 through S14 until the input density value Io reaches the maximum Imax at step S16. Executing the process of steps S12 through S15 for all the input density values Io in a range of 0 to Imax gives one screen gradation table representing the characteristics of a correction curve with respect to one dot offset (i,j).

When the input density value Io reaches the maximum Imax at step S16, the program goes to steps S6 through S9 in the flowchart of FIG. 9 to increment j or i by one until both j and i reach the value N. The process of steps S2 through S5 are executed for all the division coordinates (i,j), so that N×N sets of screen gradation tables are prepared respectively for N×N dot offsets (i/Rd,j/Rd) (wherein $0 \leq i,j < N$). A table number Nt is assigned to each screen gradation table for the purpose of identification. The table number Nt is given, for example, by the equation (3) given below:

$$Nt = i \times N + j \quad (3)$$

In this case, table numbers in a range of 0 to (N×N−1) are assigned to the N×N sets of screen gradation tables.

The process of FIGS. 9 and 10 will provide N×N pieces of screen gradation tables for each combination of the screen ruling Rh, the screen angle θ, and the output resolution Rd.

C. Structure and Operation of Apparatus

Figure 11:
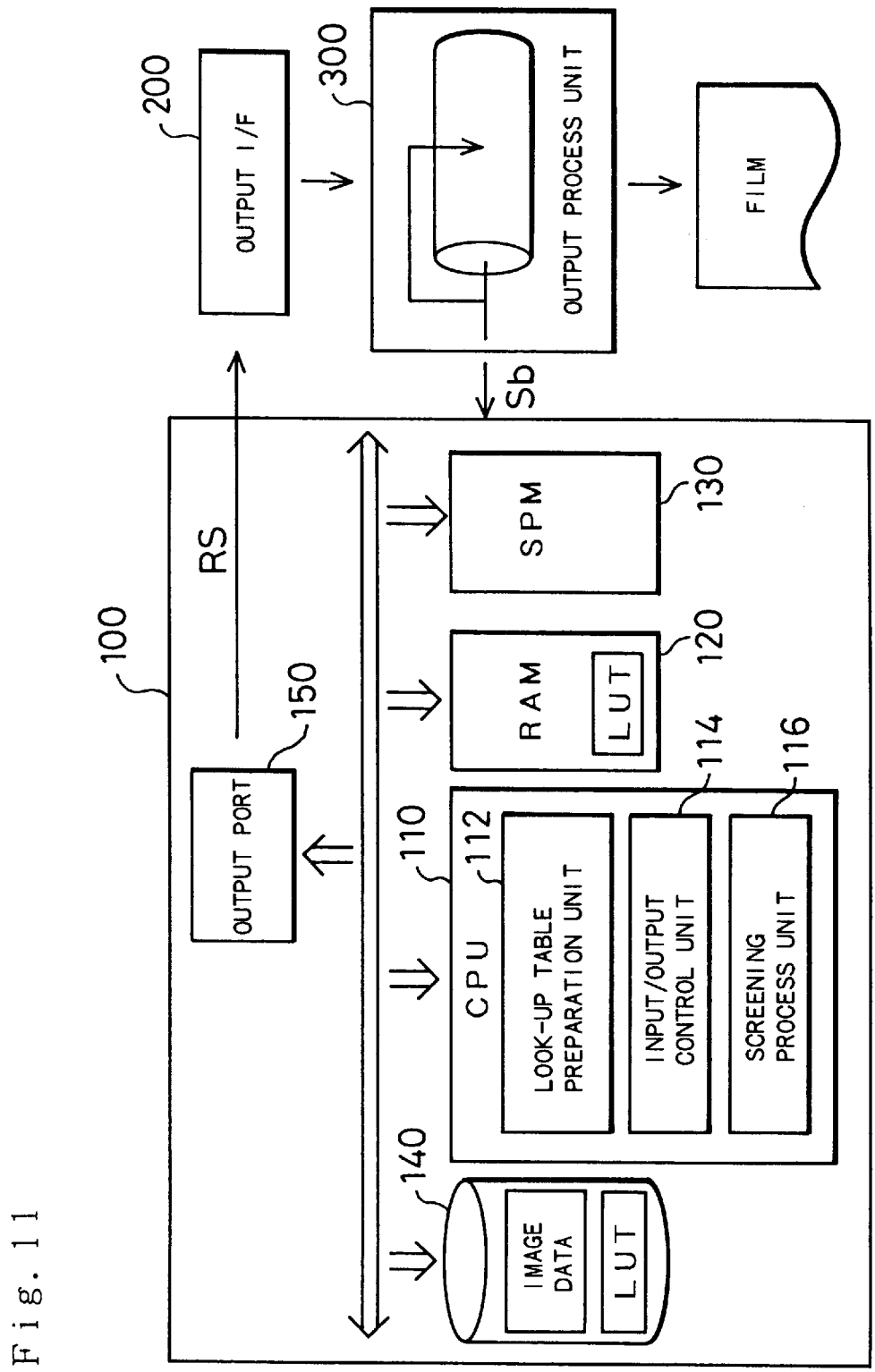
FIG. 11 is a block diagram illustrating the structure of a halftone image recording system for generating halftone images embodying the present invention.

FIG. 11 is a block diagram illustrating the structure of a halftone image recording system applied as an output device for generating halftone images embodying the present invention. The halftone image recording system includes a screening processor 100, an output interface unit 200, and an output process unit 300. The screening processor 100 includes a CPU (central processing unit) 110, a RAM (random access memory) 120, an SPM (screen pattern memory) 130, a hard disk 140, and an output port 150. Multi-tone image data, which are subjected to the screening process, are stored in the hard disk 140. In the process of generating halftone images, a beam position pulse signal Sb representing an update timing of the beam spot in the output process unit 300 is transmitted from the output process unit 300 to the screening processor 100. The screening processor 100 executes the screening process synchronously with the beam position pulse signal Sb. The term 'screening' or 'screening process' in the description represents a process of generating a binary halftone image signal from multi-tone image data.

The CPU 110 executes software programs stored in the RAM 120 to realize the functions of a look-up table preparation unit 112, an input/output control unit 114, and a screening process unit 116. The look-up table preparation unit 112 executes the process of preparing screen gradation tables according to the routine of FIGS. 9 and 10. The screening process unit 116 determines on/of of each beam spot according to the inequalities (2a) and (2b) given above to generate a binary halftone image signal RS.

Figure 12:
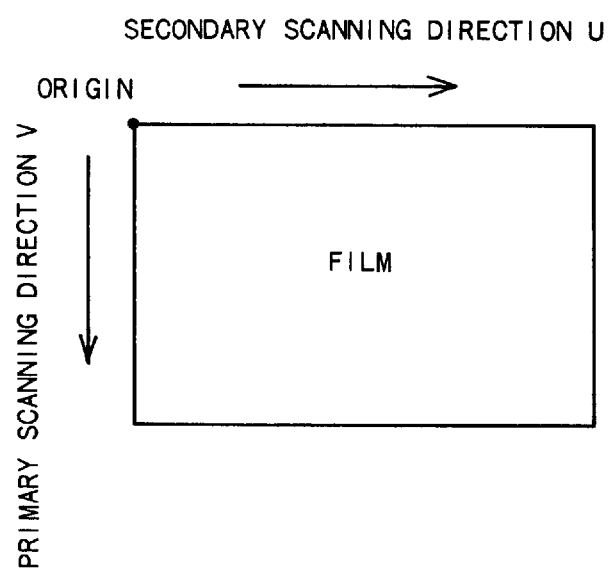
FIG. 12 shows a primary scanning direction V and a secondary scanning direction U on the photosensitive film.

The halftone image signal RS generated in the screening processor 100 is supplied to the output process unit 300 via the output port 150 of the screening processor 100 and the output interface unit 200. The output process unit 300 records a halftone image on a photosensitive film in response to the halftone image signal RS. FIG. 12 shows a primary scanning direction V and a secondary scanning direction U on the photosensitive film. The secondary scanning direction U and the primary scanning direction V are identical with the coordinates U and V in the beam coordinate system (FIG. 3).

Figure 13:
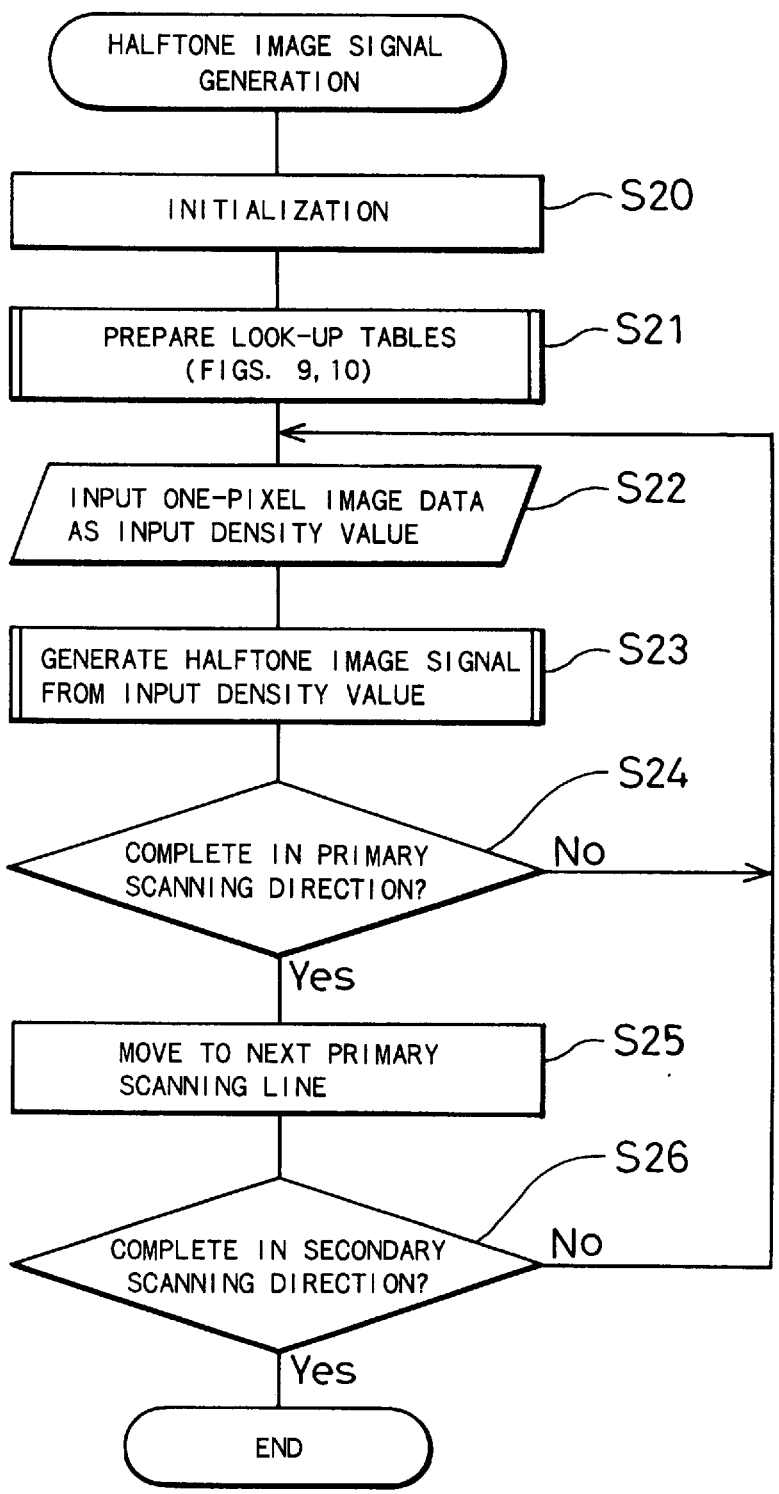
FIG. 13 is a flowchart showing an operation of the halftone image recording system of the embodiment.

FIG. 13 is a flowchart showing an operation of the screening processor 100. When the program enters the routine, initialization of the screening processor 100 is executed to set the screen ruling Rh and the screen angle θ of a resulting halftone image and the resolution Rd of the output device at step S20. The program then goes to step S21, at which screen gradation tables are prepared for the combination of preset values {Rh, θ, Rd} according to the procedure of FIGS. 9 and 10. The screen gradation tables thus prepared are stored in the RAM 120. In accordance with one preferable application, screen gradation tables are prepared in advance for typical combinations of preset values {Rh, θ, Rd} (for example, {Rh=175 LIP, θ=0, 15, 45, 75, Rd=4,000 DPI}) and stored in the hard disk 140. Screen gradation tables corresponding to the input combination of preset values {Rh, θ, Rd} are read from the hard disk 140 and written into the RAM 120 for use in the screening process. This structure allows the processing of step S21 to be omitted in the screening process.

At step S22, multi-tone image data corresponding to one beam spot (that is, an input density value Io) is input into the input/output control unit 114 to be subjected to binary coding. The program then goes to step S23, at which the screening process unit 116 generates a halftone image signal RS based on the input density value Io.

Figure 14:
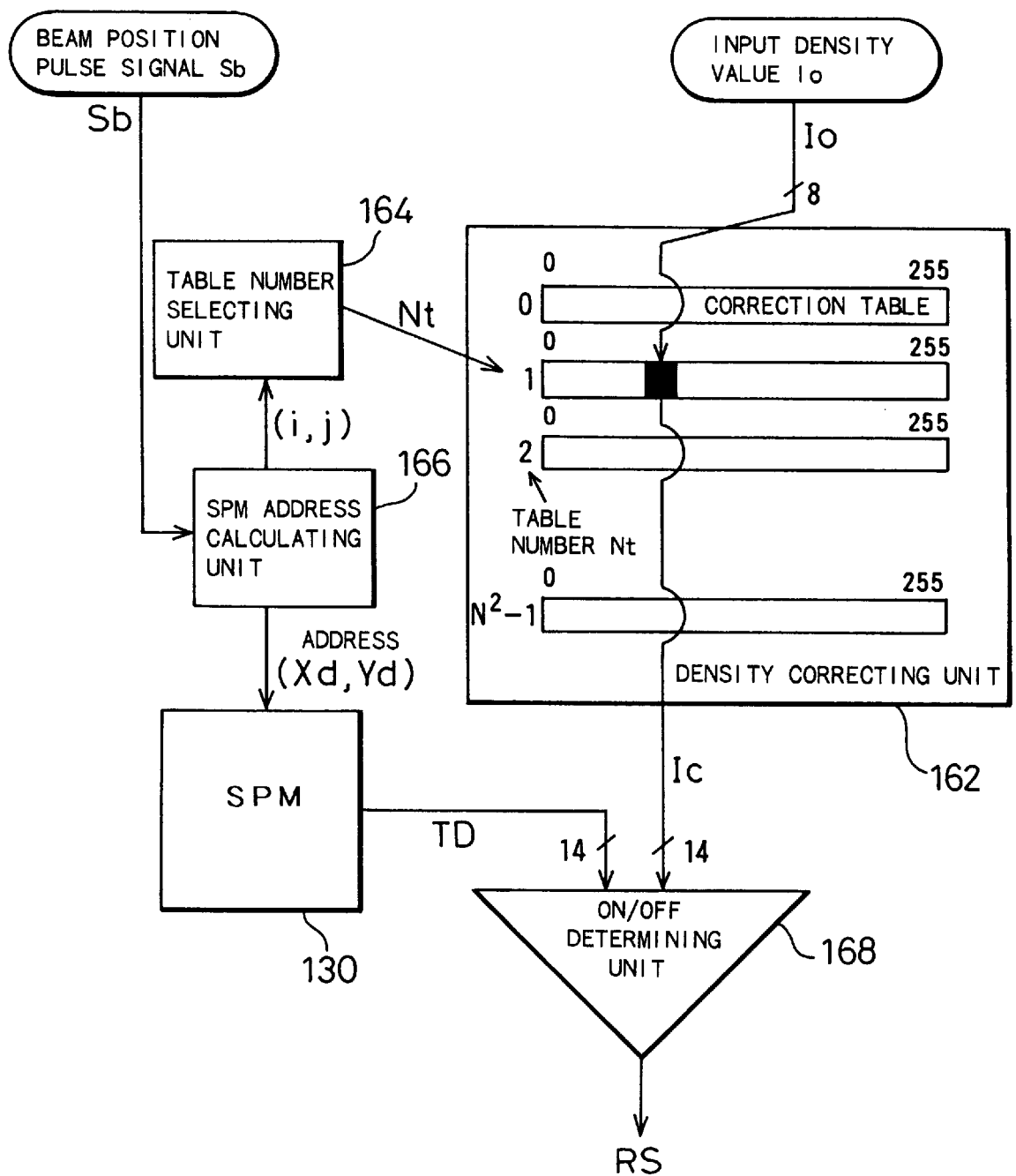
FIG. 14 is a block diagram illustrating functions of the screening process unit 116.

FIG. 14 is a block diagram illustrating functions of the screening process unit 116. The screening process unit 116 includes a density correcting unit 162, a table number selecting unit 164, an SPM address calculating unit 166, and an on/off determining unit 168.

The units 162, 164, and 166 correspond to the correction means for correcting the input density value. The SPM address calculating unit 166 corresponds to the offset calculating means for determining an offset for the halftone dot area of concern, and the table number selecting unit 164 corresponds to the selection means for selecting a screen gradation table according to the offset.

The SPM address calculating unit 166 calculates an address (Xd,Yd) of the screen pattern memory 130 for the beam spot that is under the screening process (hereinafter referred to as the 'subject beam spot') in response to the beam position pulse signal Sb transmitted from the output process unit 300, and supplies the address (Xd,Yd) to the screen pattern memory 130. A threshold value (look-up value) TD corresponding to the address (Xd,Yd) is read out from the screen pattern memory 130. In the example of FIG. 14, look-up values TD are 14-bit digital data. The SPM address calculating unit 166 further calculates division coordinates (i,j) representing an offset of the halftone dot area including the subject beam spot, and supplies the division coordinates (i,j) to the table number selecting unit 164. Details of the processing executed in the SPM address calculating unit 166 will be described later.

Figure 15:
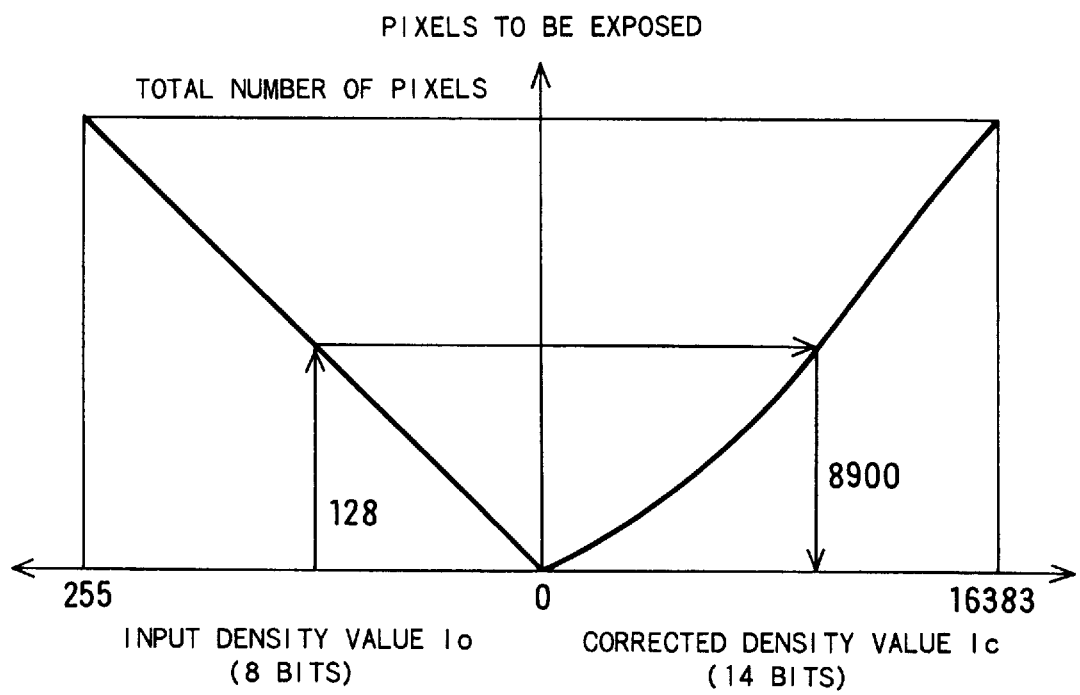
FIG. 15 shows a correction curve prepared when the input density value Io and the corrected density value Ic are set as data of different bit numbers.

The table number selecting unit 164 determines the table number Nt corresponding to the division coordinates (i,j) according to the equation (3) given above. The density correcting unit 162 selects one screen gradation table according to the table number Nt given by the table number selecting unit 164, and registers the input density value Io at the address of the selected table so as to read the corresponding corrected density value Ic. In the example of FIG. 14, the input density value Io is 8-bit data, while the corrected density value Ic is 14-bit data as is the threshold values TD read out from the screen pattern memory 130. The input density value Io and the corrected density value Ic may have different bit numbers as seen in this example. FIG. 15 shows a correction curve prepared when the input density value Io and the corrected density value Ic have different bit numbers. The correction curve of FIG. 15 is substantially identical with that of FIG. 2(A), but with a different scale on abscissa in the left-hand graph representing the relationship between the input density value Io and the number of pixels to be exposed.

The corrected density value Ic obtained in the density correcting unit 162 is given to the on/off determining unit 168, which compares the corrected density value Ic with the threshold value TD read out from the screen pattern memory 130 and generates a binary halftone image signal RS according to the inequalities (2a) and (2b) given above. The halftone image signal RS thus generated is supplied to the output process unit 300 via the output port 150 and the output interface unit 200 (FIG. 11). A halftone image is recorded on a photosensitive film in response to the halftone image signal RS.

After the halftone image signal RS for one beam spot is generated at step S23 in the flowchart of FIG. 13, the program goes to step S24, at which it is determined whether the processing is completed for the whole range of the primary scanning direction V (FIG. 12). When not completed, the program returns to step S22 to execute the process of steps S22 and S23 for a next beam spot adjoining in the primary scanning direction V. When the processing is completed for the whole range of the primary scanning direction V, on the contrary, the program process to step S25 to execute the processing for a next primary-scanning line. At step S26, it is determined whether the processing is completed for the whole range of the secondary scanning direction U. When not completed, the program returns to step S22 to repeat the process of steps S23 through S24. Repeating the process of steps S22 through S26 implements the generation of halftone image signals RS for all the range of the image, and records a resulting halftone image on a photosensitive film.

In this embodiment, a plurality of screen gradation tables are prepared according to: the division coordinates (i,j) of the dot offset OF, the screen ruling Rh, and the screen angle $\theta$ of a resulting halftone image; and the resolution Rd of the output device. The input density value Io is corrected according to one of the plurality of screen gradation tables thus prepared. The corrected density value Ic is compared with the threshold value TD read out from the screen pattern memory 130. A halftone image signal RS is then generated on the basis of the comparison to faithfully reproduce the tone level expressed by the input density value Io. The screen gradation tables can be prepared prior to generating a halftone image signal RS from the multi-tone image data (input density value Io) as shown in FIG. 13. Thus this embodiment generates a halftone image which faithfully reproduces the tone level expressed by the input density value Io without increasing the process time for generating the halftone image signal RS from the input density value Io.

Figure 16:
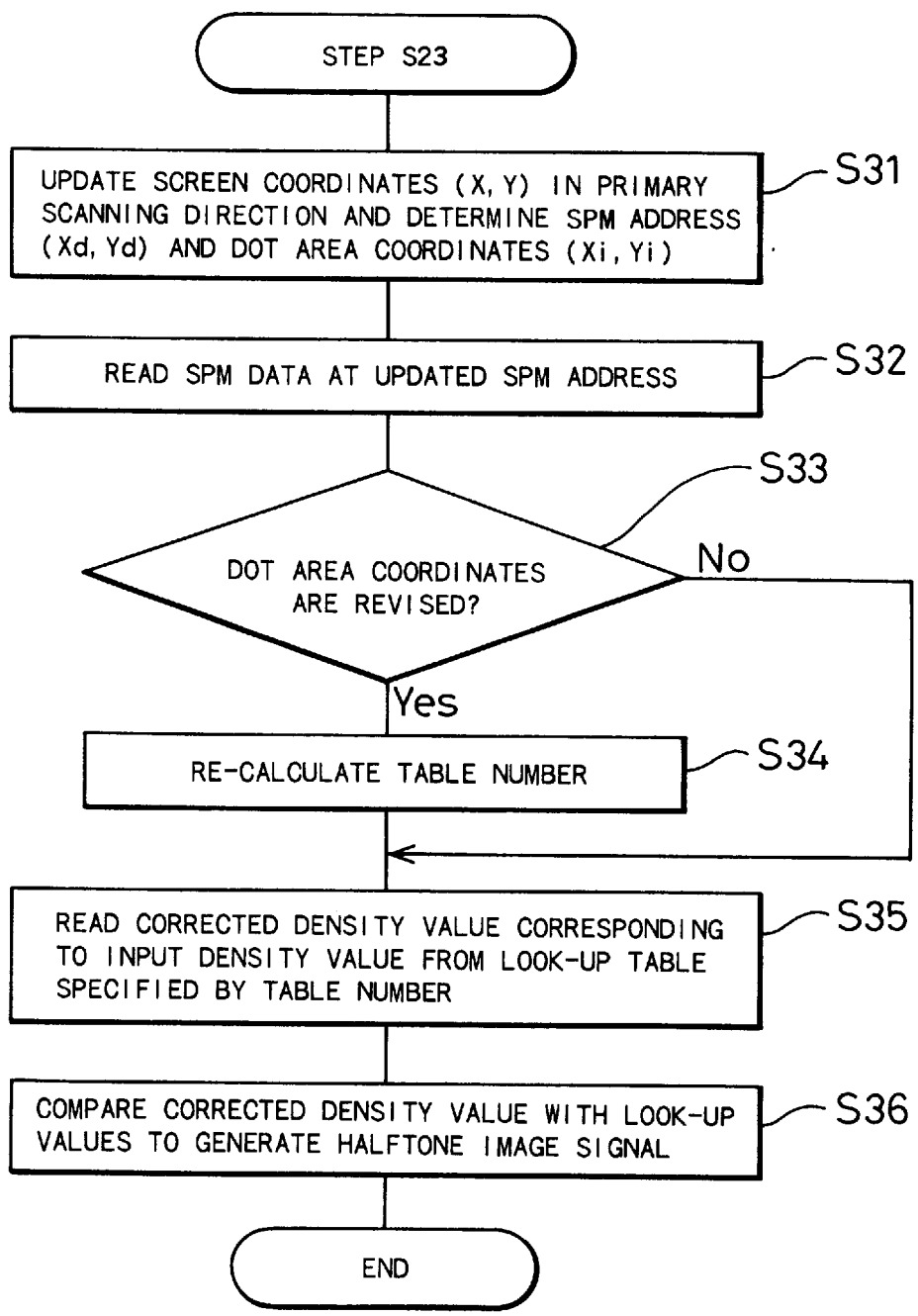
FIG. 16 is a flowchart showing details of the processing executed at step S23 in the flowchart of FIG. 13.

D. Details of the Process of Generating a Halftone Image Signal for Each Beam Spot FIG. 16 is a flowchart showing details of the processing executed at step S23 in the flowchart of FIG. 13. The process of step S23 shown in FIG. 16 is executed every time when one pulse of the beam position pulse signal Sb is transmitted from the output process unit 300 (FIG. 11) to the SPM address calculating unit 166 shown in FIG. 14.

At step S31, the screening process unit 116 updates screen coordinates (X,Y) in the primary scanning direction V and determines an SPM address (Xd,Yd) and halftone dot area coordinates (Xi,Yi). FIG. 17(A) shows the halftone dot area coordinates (Xi,Yi), whereas FIG. 17(B) shows the SPM address (Xd,Yd). The halftone dot area coordinates (Xi,Yi) shown in FIG. 17(A) represent the position of each halftone dot area. The halftone dot area coordinates (Xi,Yi) consist of the integral parts of the screen coordinates (X,Y). Fig. 17(B) is an enlarged view illustrating a halftone dot area defined by the halftone dot area coordinates (Xi,Yi)=(1,2). The SPM address (Xd,Yd) shown in FIG. 17(B) represents the position within one halftone dot area (SPM area). The SPM address (Xd,Yd) consist of the decimal parts of the screen coordinates (X,Y).

The output process unit 300 records a halftone image by exposing a recording medium, such as a photosensitive film, to a light beam running in the primary scanning direction V. The expression 'updating screen coordinates (X,Y) in the primary scanning direction V' implies determination of the screen coordinates (X,Y) when the position of exposure is varied by a pitch $\Delta$V of beam spots in the primary scanning direction V.

Conversion of the beam spot coordinates (U,V) to the screen coordinates (X,Y) is expressed in general by the equations (4a) and (4b) give n below:

$$X = U \cdot \cos\theta - V \cdot \sin\theta \quad (4a)$$

$$Y = U \cdot \sin\theta + V \cdot \cos\theta \quad (4b)$$

Figure 17:
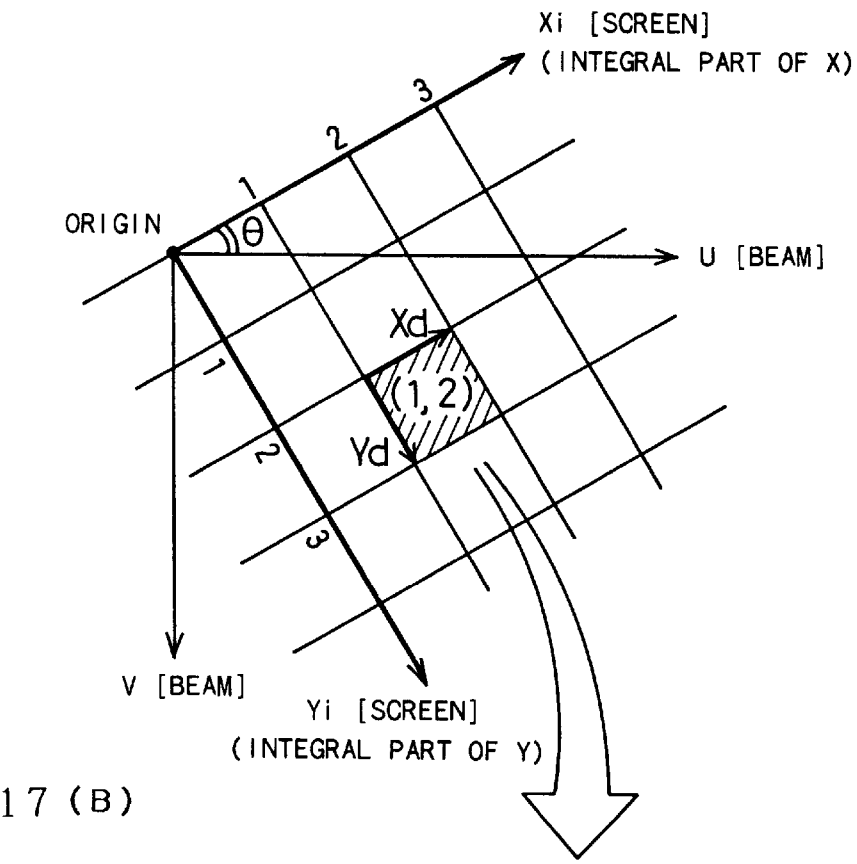
FIGS. 17(A) and 17(B) show the halftone dot area coordinates (Xi,Yi) and the SPM address (Xd,Yd) with respect to the screen coordinates (X,Y)
Figure 17:
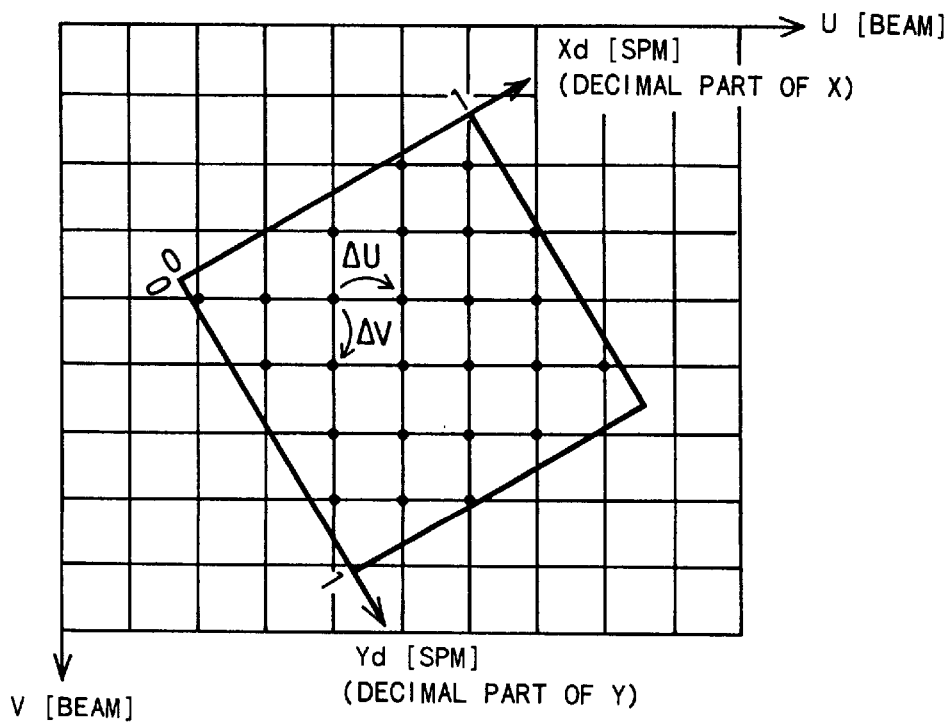

By substituting U=m$\Delta$U and V=n$\cdot\Delta$V, the equations (4a) and 4(b) are rewritten as:

$$X = m \cdot \Delta U \cos\theta - n \cdot \Delta V \sin\theta \quad (5a)$$

$$Y = m \cdot \Delta U \sin\theta + n \cdot \Delta V \cos\theta \quad (5b)$$

wherein m and n are integers, and $\Delta$U and $\Delta$V represent the pitch of beam spots in the secondary scanning direction and the primary scanning direction (FIG. 17).

Since the secondary scanning coordinate U has a fixed value on the entirety of one scanning line in the primary scanning direction V, the integer m in the equations (5a) and (5b) is constant on each scanning line. Updating the screen coordinates (X,Y) in the primary scanning direction V only varies the integer n in the second term of the right-hand side of the equations (5a) and (5b) by one. Progress of the beam spot by one in the primary scanning direction V decreases the X coordinate by $\Delta$V$\cdot\sin\theta$ and increases the Y coordinate by $\Delta$V$\cdot\cos\theta$ accordingly.

At step S31 of FIG. 16, screen coordinates (X,Y) are calculated according to the equations (5a) and (5b) given above, and the decimal parts of the screen coordinates (X,Y) are used as the SPM address (Xd,Yd) while the integral parts thereof are adopted as the halftone dot area coordinates (Xi,Yi).

The updating process of the secondary scanning coordinate U at step S25 in the flowchart of FIG. 13 increments the integer m in the first term of the right-hand side of the above equations (5a) and (5b) by one.

At step S32 in the flowchart of FIG. 16, a threshold value TD at the updated SPM address (Xd,Yd) is read out from the screen pattern memory 130 (FIG. 14).

Figure 18:
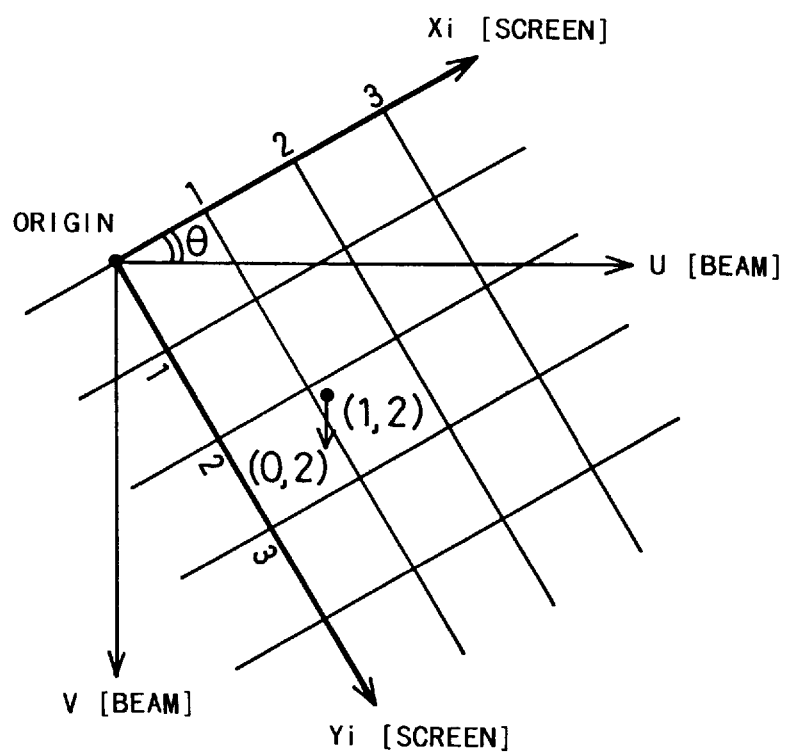
FIG. 18 shows an update of the halftone dot area coordinates (Xi,Yi) with an update of the beam spot position.

The program then proceeds to step S33, at which it is determined whether the halftone dot area coordinates (Xi, Yi) are revised by the calculation of step S31. FIG. 18 shows revision of the halftone dot area coordinates (Xi,Yi) caused by an update of the beam spot position. The halftone dot area coordinates (Xi,Yi) are revised when the beam spot position is shifted from one halftone dot area to an adjoining halftone dot area. In the example of FIG. 18, the halftone dot area coordinates (Xi,Yi) are revised from (1,2) to (0,2). Since different correction curves are applied to different halftone dot areas, the table number (i,j) is re-calculated for the new halftone dot area including the subject beam spot at step S34.

Figure 19:
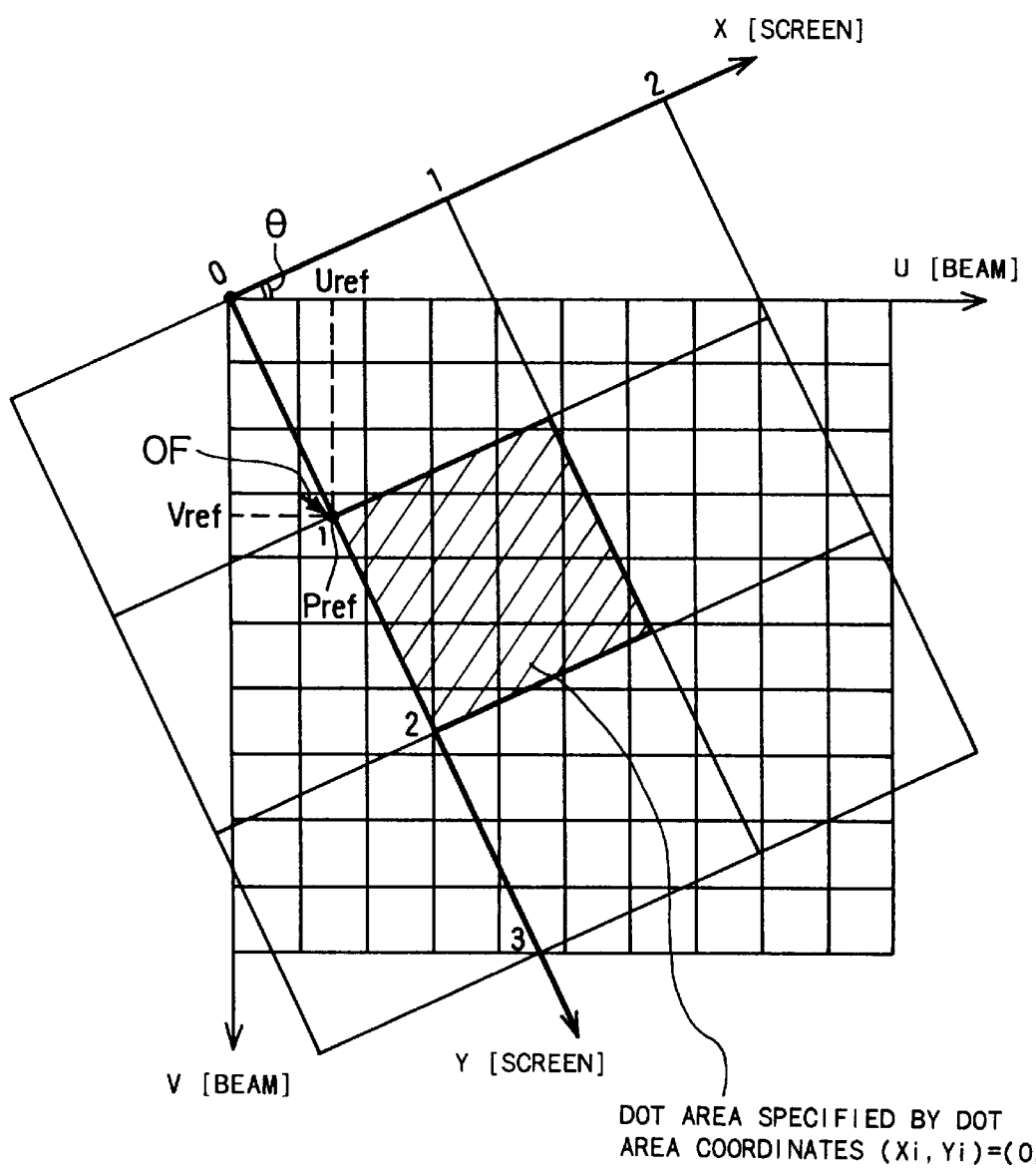
FIG. 19 shows the actual procedure executed at step S34 for determining the division coordinates (i,j)

FIG. 19 shows the actual procedure executed at step S34 for determining the division coordinates (i,j). The halftone dot area coordinates (Xi,Yi) are identical with the screen coordinates (X,Y) of the reference point (the upper-left point) Pref of the halftone dot area according to their definitions. At step S34, the halftone dot area coordinates (Xi,Yi) are converted to coordinates in the U-V coordinate system, that is, coordinates (Uref,Vref) of the reference point Pref, according to the equations (6a) and (6b) given below:

$$Uref = Xi \cdot \cos\theta + Yi \cdot \sin\theta \quad (6a)$$

$$Vref = -Xi \cdot \sin\theta + Yi \cdot \cos\theta \quad (6b)$$

wherein Uref and Vref are values including decimal parts. The integral parts of the coordinates (Uref,Vref) represent the coordinates of the upper-left pixel closest to the reference point Pref, whereas the decimal parts thereof represent the offset OF of the halftone dot area (FIG. 19). The decimal parts of the coordinates (Uref, Vref) are then substituted as the division coordinates (i,j) into the equation (3). This process determines the table number Nt. The number m of the lower bits representing the decimal parts of the coordinates (Uref, Vref) may be set to be an integer satisfying the equation $N=2^m$, where N denotes a number of divisions of the offset in one scanning direction (FIG. 7). This allows the value of the lower bits representing the decimal parts of the coordinates (Uref, Vref) to be directly used as the division coordinates (i,j).

After the determination of the table number Nt at step S34, the program proceeds to step S35 in the flowchart of FIG. 16, at which a screen gradation table specified by the table number Nt is selected (FIG. 14), and the corrected density value Ic corresponding to the input density value Io is read out from the screen gradation table thus selected. At step S36, the corrected density value Ic is compared with the look-up value or threshold value read out from the screen pattern memory 130, and generates a halftone image signal RS from the result of the comparison.

In the process of FIG. 16, a screen gradation table is selected for each halftone dot area including the pixel under processing according to the offset of the halftone dot area, and corrects the input density value based on the selected screen gradation table. This gives the halftone image signal RS, which faithfully reproduces the tone level expressed by the input density value, based on the offset of each halftone dot area.

E. Other Embodiments

Figure 20:
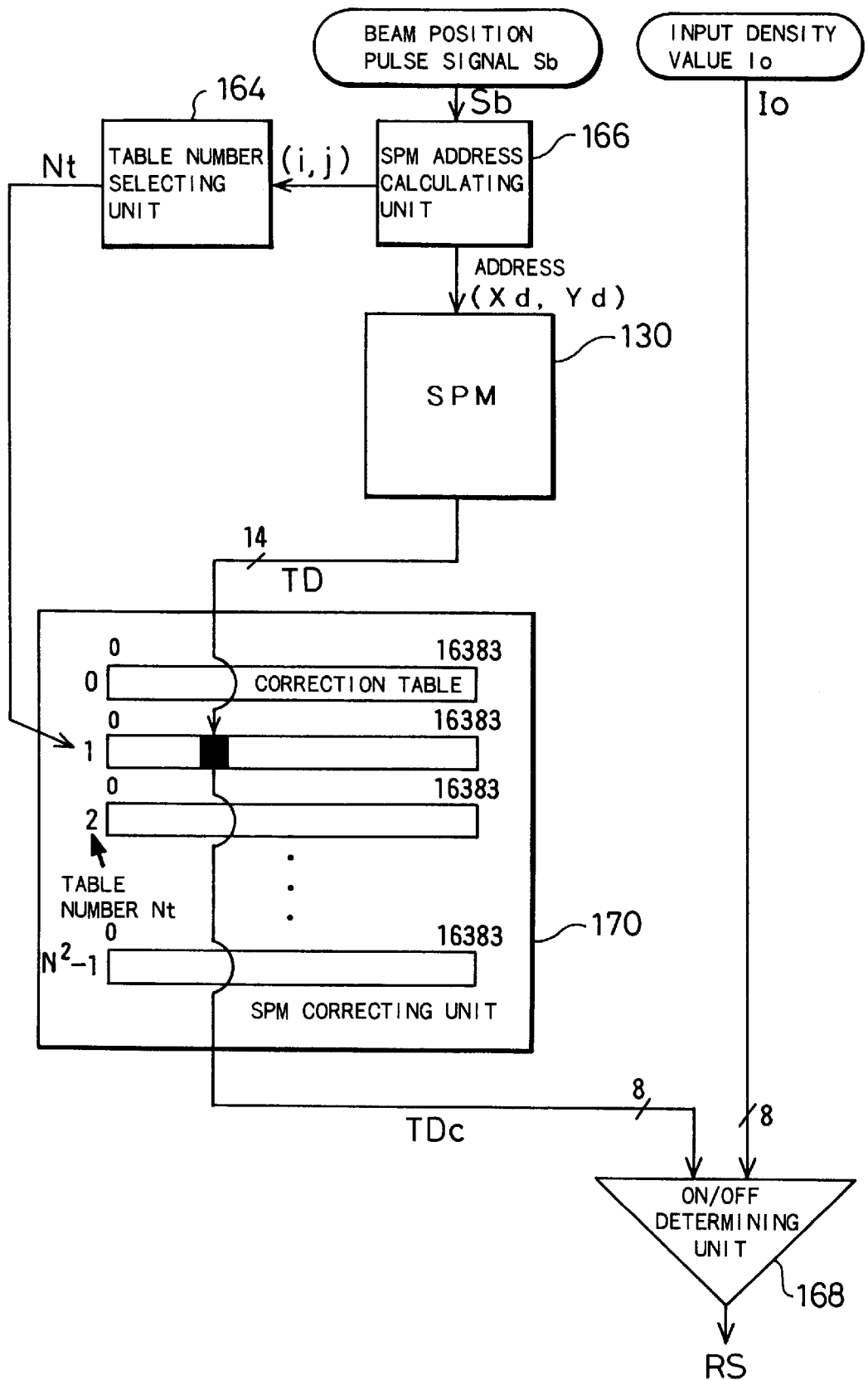
FIG. 20 is a block diagram illustrating another structure of the screening process unit and screen pattern memory.

FIG. 20 is a block diagram illustrating another structure of the screening process unit and screen pattern memory. The structure of FIG. 20 includes an SPM correcting unit 170 in place of the density correcting unit 162 of FIG. 14. The SPM correcting unit 170 corrects each threshold value TD read out from the screen pattern memory 130 to generate a corrected threshold value TDc. The on/off determining unit 168 compares the corrected threshold values TDc with the input density value Io and generates a halftone image signal RS based on the result of the comparison. Like the density correcting unit 162 shown in FIG. 14, the SPM correcting unit 170 includes N×N correction tables corresponding to the respective division coordinates (i,j) of dot offsets. One correction table is selected according to the table number Nt determined by the table number selecting unit 164. Each correction table included in the SPM correcting unit 170 is a look-up table, from which an 8-bit corrected threshold value TDc is read out while using each 14-bit threshold value TD read out from the screen pattern memory 130 as an address. The contents of the correction tables are predetermined to attain the faithful reproduction of the tone level expressed by the input density value Io. In the structure of FIG. 20, the look-up table preparation unit 112 calculates the contents of each correction table included in the SPM correcting unit 170 and writes the calculated contents into the RAM 120 at step S21 in the flowchart of FIG. 13.

The units 164, 166, and 170 correspond to the correction means for correcting threshold values.

Correction of threshold values TD, which is read out from the screen pattern memory 130 according to the dot offset as in the case of FIG. 20, gives a substantially identical result to that attained by the structure of correcting the input density value Io (FIG. 14).

Figure 21:
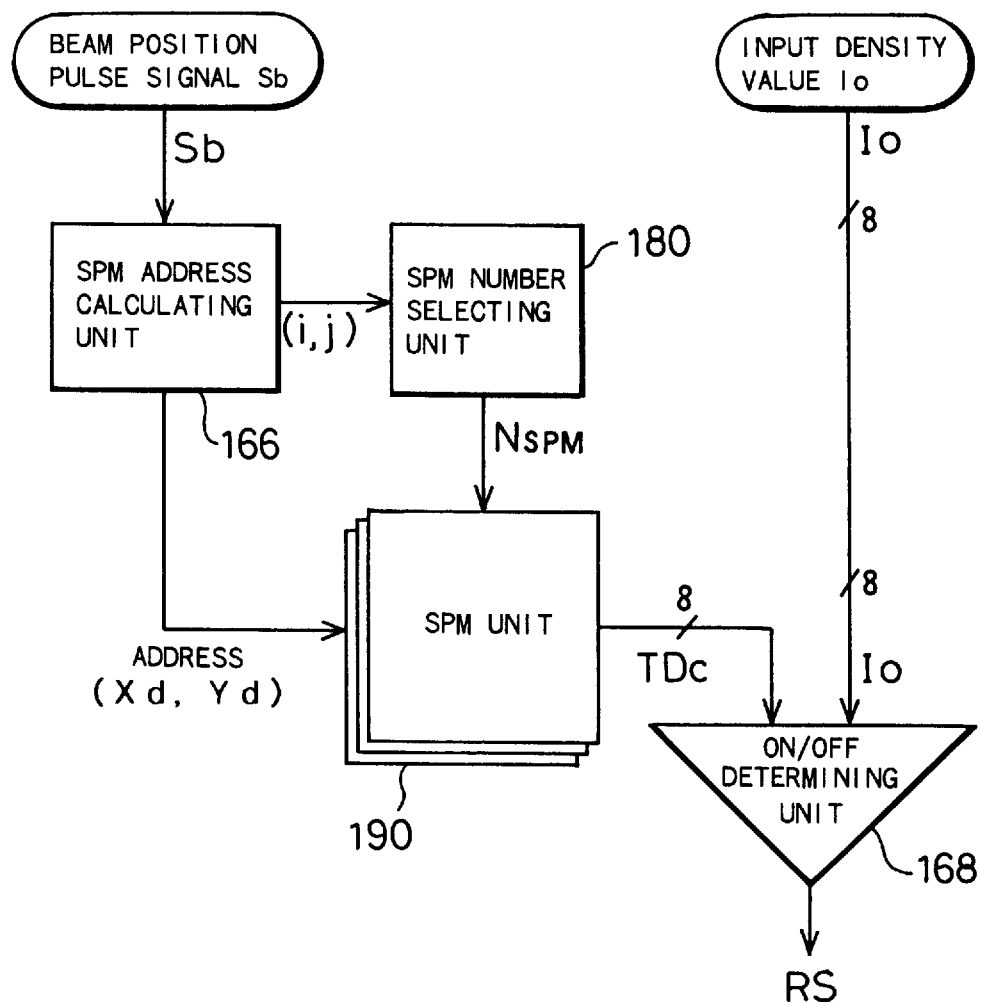
FIG. 21 is a block diagram illustrating still another structure of the screening process unit and screen pattern memory.

Fig. 21 is a block diagram illustrating still another structure of the screening process unit and screen pattern memory. The structure of FIG. 21 includes an SPM number selecting unit 180 in place of the table number selecting unit 164 and an SPM unit 190 in place of the screen pattern memory 130 and the SPM correcting unit 170 of FIG. 20. The SPM unit 190 includes N×N screen pattern memories corresponding to N×N dot offsets. Each screen pattern memory included in the SPM unit 190 is a RAM in which corrected threshold values TDc corresponding to each dot offset are written at the respective look-up positions. Arbitrary values can be assigned to the threshold values which are not to be looked up. The corrected threshold values TDc read out from the SPM unit 190 are identical with those output from the SPM correcting unit 170 in the embodiment shown in FIG. 20. In the structure of FIG. 21, the look-up table preparation unit 112 calculates the contents of each screen pattern memory included in the SPM unit 190 and writes the calculated contents into the RAM 120 at step S21 in the flowchart of FIG. 13. The look-up table preparation unit 112 functions as the threshold matrix preparation means for preparing a plurality of threshold matrices.

The SPM number selecting unit 180 determines an SPM number $N_{SPM}$ according to the division coordinates (i,j) given by the SPM address calculating unit 166. The SPM number $N_{SPM}$ is equivalent to the table number Nt in the embodiment of FIG. 20 and used to identify a screen pattern memory corresponding to each dot offset. A screen pattern memory is selected from the plurality of screen pattern memories included in the SPM unit 190 according to the division coordinates (i,j), and the corrected threshold values TDc is read out from the selected screen pattern memory. The corrected threshold values TDc is compared with the input density value Io to generate a halftone image signal RS.

The structure of FIG. 21 uses a plurality of screen pattern memories, each of which stores corrected threshold values corresponding to each dot offset, and accordingly does not require any correction look-up tables as used in the embodiments of FIGS. 14 and 20. The structure of FIG. 14 or FIG. 21, on the other hand, does not require N×N screen pattern memories corresponding to the respective dot offsets, but uses only one screen pattern memory.

The above embodiments are only illustrative and not restrictive in any sense. There may be many changes, modifications, and alterations without departing from the scope or spirit of essential characteristics of the invention. Some examples of modification are given below.

Figure 22:
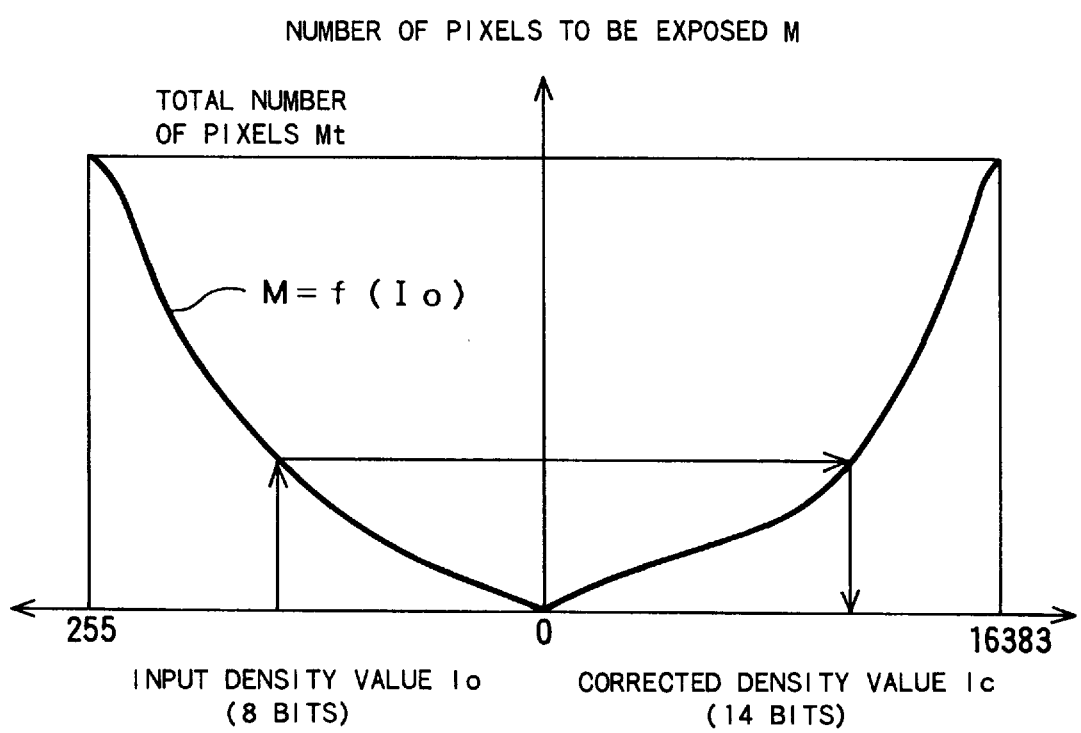
FIG. 22 shows a correction curve including a non-linear relationship between the input density value and the number of pixels to be exposed.

(1) The correction curve shown in FIG. 2(A) or FIG. 15 shows a linear relationship between the input density value Io and the number of pixels M to be exposed. The principle of the present invention is also applicable to a non-linear relationship expressed by a curve M=f(Io) as shown in FIG. 22. When the correction curve includes a non-linear relationship as shown in FIG. 22, the process of step S12 in the flowchart of FIG. 10 determines the number of pixels M to be exposed corresponding to the input density value Io by the function M=f(Io). In accordance with a concrete procedure, the corrected density value Ic is set to be greater than an M-th lowest value among Mt pieces of threshold values, which correspond to Mt pixels existing in a halftone dot area. Alternatively, the correction of threshold values is implemented by correcting threshold values up to an M-th lowest value among Mt threshold values, which correspond to Mt pixels existing in a halftone dot area, to be less than the input density value Io. This method would generate a halftone dot having a desired dot percent of M/Mt corresponding to the input density value in each halftone dot area.

(2) The principle of the present invention is applicable to the Rational Tangent Method as well as the Irrational Tangent Method described above. When applied to the Rational Tangent Method, at least either of an input density value and a threshold value is corrected to generate a halftone dot having a desired dot percent corresponding to the input density value in each halftone dot area, thereby reproducing a desired tone corresponding to the input density value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of comparing multi-tone image data with a threshold value to generate a halftone image signal representing an on/off state of each of pixels arranged in lattices on an image plane, and forming a halftone dot in response to said halftone image signal in each halftone dot area which is repeatedly arranged to form an array of halftone dot areas on said image plane, said method comprising the steps of:
   (a) specifying values of a variable screen angle and a variable screen ruling; and
   (b) correcting at least either of a level of the multi-tone image data and a level of the threshold value according to the values of the variable screen angle and the variable screen ruling which define the array of halftone dot areas on the image plane so that a halftone dot formed in said each halftone dot area has a desired halftone dot percent specified by the multi-tone image data.

2. A method in accordance with claim 1, wherein said step (b) includes the steps of:
   (c) determining an offset for said each halftone dot area including a subject pixel to be processed, as a function of a resolution of the pixels as well as the values of the screen ruling and the screen angle, said offset representing a deviation of a predetermined reference point of said each halftone dot area from the pixel lattices; and
   (d) correcting at least either of the level of the multi-tone image data and the level of the threshold value according to said offset.

3. A method in accordance with claim 2 further comprises the step of:
   preparing a plurality of correction look-up tables with respect to a plurality of combinations of the screen ruling, the screen angle, the resolution of the pixels, and the offset, said plurality of correction look-up tables being adaptable to be used to perform said correcting at said step (c); and wherein said step (c) includes the steps of:
   selecting one of the plurality of correction look-up tables according to the offset; and
   correcting one of the multi-tone image data and the threshold value based on the selected correction look-up tables.

4. A method in accordance with claim 2, wherein said step (a) further comprises the step of:
   preparing a plurality of corrected threshold matrices with respect to a plurality of combinations of the screen ruling, the screen angle, the resolution of the pixels, and the offset; and wherein
said step (c) includes the steps of:
   selecting one of the plurality of corrected threshold matrices according to the offset; and
   reading out a corrected threshold value from the corrected threshold matrix thus selected.

5. A method in accordance with claim 1, wherein said desired halftone dot percent corresponding to multi-tone image data Io is given by M(Io)/Mt, where M(Io) denotes the number of pixels to form the halftone dot in said each halftone dot area, and Mt denotes a total number of pixels in one halftone dot area;
wherein said step (a) includes the step of:
   correcting the multi-tone image data to be greater than an M(Io)-th lowest value among Mt threshold values corresponding to Mt pixels existing in said each halftone dot area.

6. A method in accordance with claim 1, wherein said desired halftone dot percent corresponding to multi-tone image data Io is given by M(Io)/Mt, where M(Io) denotes the number of pixels to form the halftone dot in said each halftone dot area, and Mt denotes a total number of pixels in one halftone dot area; and wherein said step (a) includes the step of:
   correcting the lowest through an M(Io)-th lowest values among Mt threshold values corresponding to Mt pixels existing in said each halftone dot area to be less than the multi-tone image data Io.

7. An apparatus for comparing multi-Lone image data with a threshold value to generate a halftone image signal representing an on/off state of each of pixels arranged in lattices on an image plane, and forming a halftone dot in response to said halftone image signal in each halftone dot area which is repeatedly arranged to form an array of halftone dot areas on the image plane, said apparatus comprising:
   specifying means for specifying values of a variable screen angle and a variable screen ruling;
   a threshold memory for storing the threshold value representing a shape of a halftone dot according to an image density; and
   correction means for correcting at least either of a level of the multi-tone image data and a level of the threshold value according to the values of the variable screen angle and the variable screen ruling which define the array of halftone dot areas on the image plane so that a halftone dot formed in said each halftone dot area has a desired halftone dot percent specified by the multi-tone image data.

8. An apparatus in accordance with claim 7, wherein said correction means comprises:
   offset calculating means for determining an offset for said each halftone dot area including a subject pixel to be processed, as a function of a resolution of the pixels as well as the values of the screen ruling and screen angle, said offset representing a deviation of a predetermined reference point of said each halftone dot area from the pixel lattices; and correction executing means for correcting at least either of the level of the multi-tone image data and the level of the threshold value according to said offset.

9. An apparatus in accordance with claim 8, wherein the correction executing means comprises:

look-up table preparation means for preparing a plurality of correction look-up tables with respect to a plurality of combinations of the screen ruling, the screen angle, the resolution of the pixels, and the offset, said plurality of correction look-up tables being adaptable to be used to correct the multi-tone image data;

selection means for selecting one of said plurality of correction look-up tables according to the offset calculated by the offset calculating means; and means for correcting the multi-tone image data based on the correction look-up table selected by the selection means.

10. An apparatus in accordance with claim 9, wherein said desired halftone dot percent corresponding to multi-tone image data Io is given by M(Io)/Mt, where M(Io) denotes the number of pixels to form the halftone dot in said each halftone dot area, and Mt denotes a total number of pixels in one halftone dot area; and wherein said look-up table preparation means includes:

means for obtaining corrected multi-tone image data Ic for each of the multi-tone image data Io, the corrected multi-tone image data Ic being set to be greater than an M(Io)-th lowest value among Mt threshold value corresponding to Mt pixels existing in said each halftone dot area; and means for registering relations between the multi-tone image data Io and the corrected multi-tone image data Ic into said plurality of correction look-up tables.

11. An apparatus in accordance with claim 8, wherein the correction executing means comprises:

look-up table preparation means for preparing a plurality of correction look-up tables with respect to a plurality of combinations of the screen ruling, the screen angle, the resolution of the pixels, and the offset, said plurality of correction look-up tables being adaptable to be used to correct the threshold value;

selection means for selecting one of said plurality of correction look-up tables according to the offset calculated by the offset calculating means; and means for correcting the threshold value based on the correction look-up table selected by the selection means.

12. An apparatus in accordance with claim 11, wherein said desired halftone dot percent corresponding to multi-tone image data Io is given by M(Io)/Mt, where M(Io) denotes the number of pixels to form the halftone dot in said each halftone dot area, and Mt denotes a total number of pixels in one halftone dot area; and wherein said look-up table preparation means includes:

means for determining corrected threshold values by setting the lowest through an M(Io)-th lowest values among Mt threshold values corresponding to Mt pixels existing in said each halftone dot area to be less than the multi-tone image data Io; and means for registering relations between the multi-tone image data Io and the corrected threshold value into said plurality of correction look-up tables.

13. An apparatus for comparing multi-tone image data with a threshold value to generate a halftone image signal representing an on/off state of each of pixels arranged in lattices on an image plane, and forming a halftone dot in response to said halftone image signal in each halftone dot area which is repeatedly arranged to form an array of halftone dot areas on the image plane, said apparatus comprising:

offset calculating means for determining an offset for said each halftone dot area including a subject pixel to be processed, as a function of a resolution of the pixels as well as a screen ruling and a screen angle which define the array of halftone dot areas on the image plane, said offset representing a deviation of a predetermined reference point of said each halftone dot area from the pixel lattices;

matrix preparation means for preparing a plurality of corrected threshold matrices for a plurality of combinations of the screen ruling, the screen angle, the resolution of the pixels, and the offset, said plurality of corrected threshold matrices being adaptable to be compared with the multi-tone image data so that a halftone dot is formed in said each halftone dot area to have a desired halftone dot percent specified by the multi-tone image data;

a plurality of threshold memories for storing said plurality of corrected threshold matrices;

selection means for selecting one of said plurality of threshold memories according to the offset calculated by the offset calculating means;

means for reading out a corrected threshold value from the threshold memory selected by the selection means; and comparison means for comparing the corrected threshold value read out from the selected threshold memory with the multi-tone image data, thereby generating the halftone image signal.

14. An apparatus in accordance with claim 13, wherein said desired halftone dot percent corresponding to multi-tone image data Io is given by M(Io)/Mt, where M(Io) denotes the number of pixels to form the halftone dot in said each halftone dot area, and Mt denotes a total number of pixels in one halftone dot area; and wherein said matrix preparation means comprises:

means for correcting the lowest through an M(Io)-th lowest values among Mt threshold values corresponding to Mt pixels existing in said each halftone dot area to be less than the multi-tone image data Io, to thereby obtain corrected threshold values to be stored in said plurality of corrected threshold matrices.

* * * * *